US012589751B2

(12) United States Patent

Eisenmann et al.

(10) Patent No.: US 12,589,751 B2
(45) Date of Patent: Mar. 31, 2026

(54) SYSTEMS AND METHODS FOR VEHICLE CONTROL USING TERRAIN-BASED LOCALIZATION

(71) Applicant: ClearMotion, Inc., Billerica, MA (US)

(72) Inventors: John Parker Eisenmann, Burlington, MA (US); Marco Giovanardi, Melrose, MA (US); Stefan Schulze, Brookline, MA (US); William Graves, Somerville, MA (US); Vijayaraghavan Sridhar, New York, NY (US); Marcus Joseph Proctor, Goffstown, NH (US); Jack A. Ekchian, Belmont, MA (US)

(73) Assignee: ClearMotion, Inc., Billerica, MA (US)

( * ) Notice: Subject to any disclaimer, the term of this patent is extended or adjusted under 35 U.S.C. 154(b) by 81 days.

(21) Appl. No.: 17/511,331

(22) Filed: Oct. 26, 2021

(65) Prior Publication Data

US 2022/0212678 A1    Jul. 7, 2022

Related U.S. Application Data

(60) Provisional application No. 63/132,184, filed on Dec. 30, 2020, provisional application No. 63/106,341, filed on Oct. 27, 2020.

(51) Int. Cl.
　　　*B60W 40/105* 　　(2012.01)
　　　*B60W 20/20* 　　(2016.01)
　　　*H04W 4/40* 　　(2018.01)
(52) U.S. Cl.
　　　CPC .......... *B60W 40/105* (2013.01); *B60W 20/20* (2013.01); *H04W 4/40* (2018.02);
　　　　　　　(Continued)

(58) Field of Classification Search
　　　CPC .............. B60W 40/105; B60W 20/20; B60W 2552/20; B60W 2552/53; B60W 2510/081; H04W 4/40
　　　　　　　(Continued)

(56) References Cited

U.S. PATENT DOCUMENTS

| | | |
|---|---|---|
| 8,589,063 B2 | 11/2013 | Trum |
| 10,486,485 B1 | 11/2019 | Levinson et al. |

(Continued)

FOREIGN PATENT DOCUMENTS

| | | |
|---|---|---|
| DE | 102008032545 A1 | 1/2010 |
| DE | 102014223475 A1 | 5/2016 |

(Continued)

OTHER PUBLICATIONS

International Search Report and Written Opinion for International Application No. PCT/US2021/056690 mailed Mar. 7, 2022.

(Continued)

*Primary Examiner* — Lindsay M Low
*Assistant Examiner* — Omar Morales
(74) *Attorney, Agent, or Firm* — Wolf, Greenfield & Sacks, P.C.

(57)　　　ABSTRACT

Systems and methods described herein include implementation of road surface-based localization techniques for advanced vehicle features and control methods including lane drift detection, passing guidance, bandwidth conservation and caching based on road data, vehicle speed correction, suspension and vehicle system performance tracking and control, road estimation calibration, and others.

19 Claims, 21 Drawing Sheets

(52) U.S. Cl.
CPC ... *B60W 2510/081* (2013.01); *B60W 2552/20* (2020.02); *B60W 2552/53* (2020.02)

(58) Field of Classification Search
USPC ........................................................ 701/41
See application file for complete search history.

(56) References Cited

U.S. PATENT DOCUMENTS

| | | | |
|---|---|---|---|
| 10,901,432 B2 | 1/2021 | Sridhar et al. | |
| 10,953,887 B2 | 3/2021 | Magnusson et al. | |
| 2013/0238192 A1 | 9/2013 | Breu | |
| 2014/0195112 A1 | 7/2014 | Lu et al. | |
| 2014/0249711 A1 | 9/2014 | Hanson et al. | |
| 2015/0094948 A1 | 4/2015 | Lu et al. | |
| 2016/0325753 A1 | 11/2016 | Stein et al. | |
| 2018/0015801 A1 | 1/2018 | Mohamed et al. | |
| 2018/0079272 A1 | 3/2018 | Aikin | |
| 2018/0154723 A1* | 6/2018 | Anderson | H02K 11/33 |
| 2019/0079539 A1 | 3/2019 | Sridhar et al. | |
| 2019/0137275 A1 | 5/2019 | Choudhury et al. | |
| 2019/0304159 A1 | 10/2019 | Dai et al. | |
| 2020/0117199 A1 | 4/2020 | Akella et al. | |
| 2020/0139784 A1 | 5/2020 | Sridhar et al. | |
| 2020/0139967 A1 | 5/2020 | Beller et al. | |
| 2020/0211394 A1 | 7/2020 | King et al. | |
| 2021/0055740 A1 | 2/2021 | Sridhar et al. | |
| 2021/0394573 A1 | 12/2021 | Vente et al. | |
| 2022/0082705 A1 | 3/2022 | Graves et al. | |
| 2022/0189302 A1 | 6/2022 | Jiang et al. | |
| 2022/0196849 A1 | 6/2022 | Chen et al. | |

FOREIGN PATENT DOCUMENTS

| | | |
|---|---|---|
| WO | WO 2012/019691 A1 | 2/2012 |
| WO | WO 2019/049080 A2 | 3/2019 |

OTHER PUBLICATIONS

Laftchiev et al., Terrain-based vehicle localization from real-time data using dynamical models. 51$^{st}$ IEEE Conference on Decision and Control. 2012:3366-71.

* cited by examiner

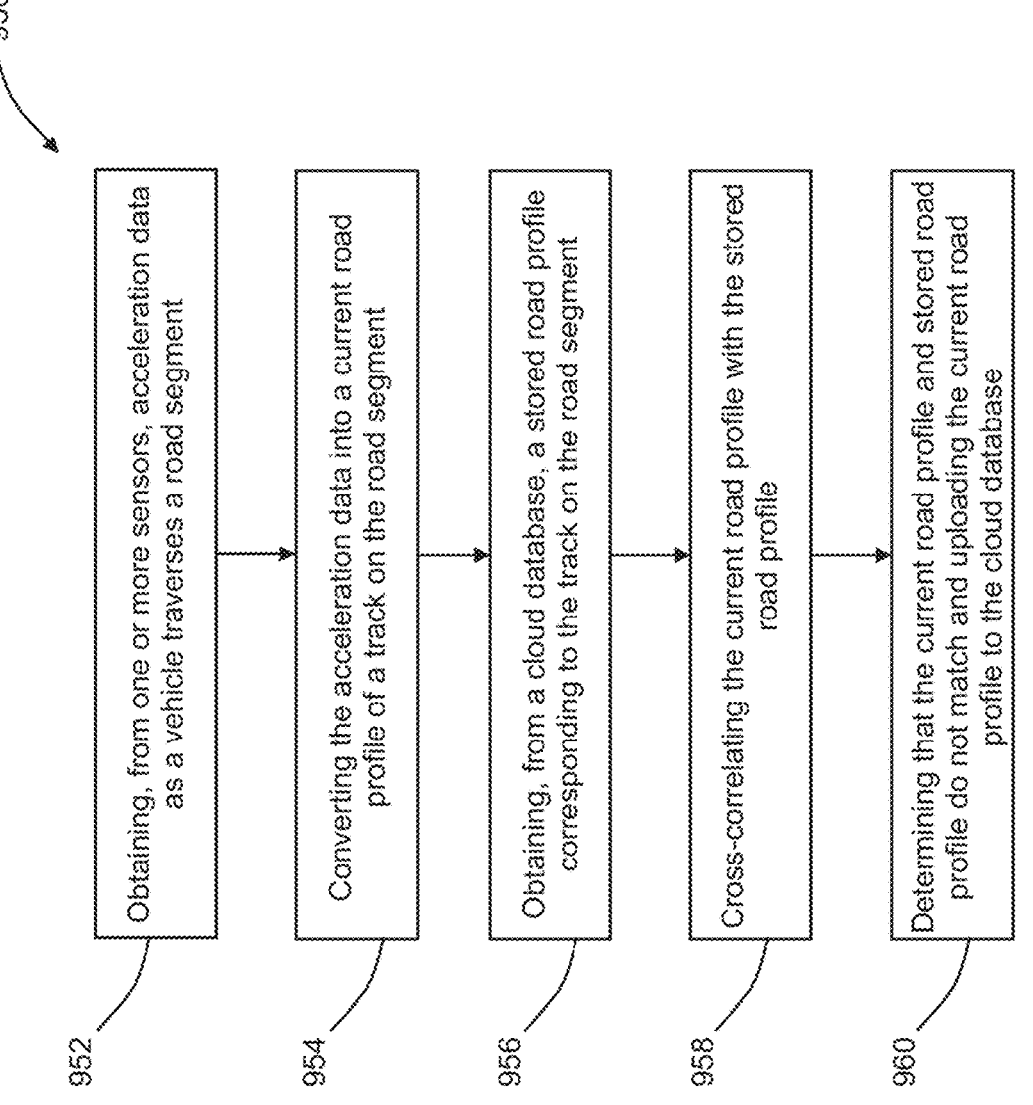

950

Obtaining, from one or more sensors, acceleration data as a vehicle traverses a road segment

952

Converting the acceleration data into a current road profile of a track on the road segment

954

Obtaining, from a cloud database, a stored road profile corresponding to the track on the road segment

956

Cross-correlating the current road profile with the stored road profile

958

Determining that the current road profile and stored road profile do not match and uploading the current road profile to the cloud database

SYSTEMS AND METHODS FOR VEHICLE CONTROL USING TERRAIN-BASED LOCALIZATION

RELATED APPLICATIONS

This application claims the benefit of priority under 35 U.S.C. § 119(e) of U.S. Provisional Application Ser. No. 63/106,341, filed Oct. 27, 2020, and U.S. Provisional Application Ser. No. 63/132,184, filed Dec. 30, 2020, the disclosures of which are incorporated herein by reference in their entirety.

TECHNICAL FIELD

Disclosed embodiments are related to systems for terrain-based localization of a vehicle and related methods of use.

BACKGROUND

Advanced vehicle features such as, for example, active suspension or autonomous or semi-autonomous driving may rely on highly accurate localization of a vehicle. Localization systems based on, for example, global navigation satellite systems (GNSS), may not provide sufficient accuracy or resolution for such features.

SUMMARY

Terrain-Based Lane Drift Detection

According to one aspect, the disclosure provides a method including obtaining, from one or more sensors corresponding to a left wheel of a vehicle, left wheel data as the vehicle traverses a road segment. The method also includes obtaining, from one or more sensors corresponding to a right wheel of a vehicle, right wheel data as the vehicle traverses the road segment. The method also includes obtaining, from a cloud database, two or more road profiles, each road profile corresponding to a track on the road segment. The method also includes comparing the left wheel data and the right wheel data to the two or more road profiles. The method also includes determining, by a controller, at a first time, a first match between the left wheel data or the right wheel data and a first road profile of the two or more road profiles. The method also includes determining, by the controller, a first location the vehicle on the road segment based on the first match. The method also includes determining, by the controller, at a second time, a second match between the left wheel data or the right wheel data and a second road profile of the two or more road profiles. The method also includes determining, by the controller, a second location of the vehicle on the road segment based on the second match. The method also includes determining, based on a difference between the first location and the second location, that the vehicle has completed a lane drift behavior.

In some implementations, the difference between the first location and the second location indicates that the vehicle has drifted within a lane on the road.

In some implementations, the difference between the first location and the second location indicates that the vehicle has drifted into another lane on the road.

In some implementations, the one or more sensors representing the left wheel of the vehicle comprises a left wheel sensor, wherein the one or more sensors representing the right wheel of the vehicle comprises a right wheel sensor.

In some implementations, determining a second match between the left wheel data or the right wheel data and a second road profile of the two or more road profiles comprises reversing at least a portion of the second road profile prior to determining the second match.

In some implementations, the difference between the first location and the second location indicates that the vehicle has drifted into an oncoming lane on the road.

In some implementations, the method also includes sending, to another vehicle system, a signal indicating the lane drift behavior. In some instances, the other vehicle system is an ADAS configured to present, on a display, a warning to a driver of the vehicle. In some instances, the other vehicle system is an autonomous driving controller configured to initiate steering commands for the vehicle.

In some implementations, the right wheel data is right wheel vertical acceleration data and wherein the left wheel data is left wheel vertical acceleration data.

In some implementations, determining a first match comprises exceeding a predetermined correlation threshold between either the right wheel data or the left wheel data and the first road profile.

According to another aspect, the present disclosure provides a method of locating a lateral position of a vehicle traveling along a road. The method includes (a) receiving, from a cloud-based data storage, road surface profile information of at least two tracks located in a single lane of the road. The method also includes (b) collecting road profile information from a left wheel of the vehicle and a right wheel of the vehicle. The method also includes (c) determining the lateral position of the vehicle by comparing the information received in step (a) with the information collected in step (b).

In some implementations, collecting in step (b) includes using at least one sensor selected from the group consisting of: a wheel accelerometer, a body accelerometer, and a body IMU.

Location-Based Passing Lane Guidance

According to one aspect, the present disclosure provides a method of performing lane change guidance for a vehicle including determining, using terrain-based localization, a location of the vehicle. The method also includes transmitting, from the vehicle, the location of the vehicle to a cloud database comprising crowd sourced lane change data. The method also includes receiving, at the vehicle, data indicating that the vehicle is approaching an overtaking zone. The method also includes presenting an indication that the vehicle is approaching the overtaking zone.

In some implementations, the indication is at least one of a visual, audible, or tactile indication.

In some implementations, the indication that the vehicle is approaching an overtaking zone is presented via an advanced driver assistance system.

In some implementations, the data indicating that the vehicle is approaching an overtaking zone is based on data from other vehicles similar to the vehicle in at least one aspect. In some instances, the at least one aspect is vehicle body type.

In some implementations, the data indicating that the vehicle is approaching an overtaking zone is based on data from other vehicles driving in similar conditions to the vehicle. In some instances, driving in similar conditions comprises driving in similar weather conditions. In some instances, driving in similar weather conditions comprises driving in similar precipitation conditions. In some instances, driving in similar conditions comprises driving on the same day of the week. In some instances, driving in similar conditions comprises driving at the same portion of the day.

In some implementations, the method also includes presenting an indication that the vehicle is reaching the end of an overtaking zone. In some instances, the indication is at least one of a visual, audible, or tactile indication.

In some implementations, the vehicle is a semi-autonomous or an autonomous vehicle.

Conservation of Telemetry Bandwidth by Comparison to Existing Road Data

According to one aspect, the present disclosure provides a method for updating a cloud database of road data. The method includes obtaining, from one or more sensors, acceleration data, as a vehicle traverses a track on a road segment. The method also includes converting the acceleration data into a current road profile of the track on the road segment. The method also includes obtaining, from a cloud database, a stored road profile corresponding to the road segment. The method also includes cross-correlating the current road profile with the stored road profile. The method also includes determining that the current road profile and stored road profile do not match; and uploading the current road profile to the cloud database.

In some implementations, the one or more sensors comprises a wheel sensor.

In some implementations, the method also includes updating the stored road profile, wherein updating the stored road profile comprises overwriting at least a portion of the road data in the road profile or replacing the stored road profile with the current road profile.

According to another aspect, the present disclosure provides a method for updating a cloud database of road data. The method includes obtaining, by a vehicle sensor on a vehicle, road data corresponding to a track of a road segment on which the vehicle is traveling, the road data comprising a road profile. The method also includes receiving, from a cloud database, a location of the vehicle and a road segment maturity indication corresponding to the road segment on which the vehicle is traveling. The method also includes, based on the road segment maturity indication, determining a subset of the road data to upload to the cloud database. The method also includes uploading the subset of road information to the cloud database.

In some implementations, the road data comprises road event data. In some instances, the subset of road data comprises road event data.

In some implementations, the method also includes, based on the road segment maturity indication, determining a data rate for uploading the subset of road data.

In some implementations, the road segment maturity indication is determined based on a number of drives for which the cloud database has stored road data. In some instances, the road segment maturity indication is determined based on one or more of a level of traffic, a time of day, or a day of the week.

Correction of Reported Automobile Speed by Analysis of GPS Coordinates

According to one aspect, the present disclosure provides a method of correcting a speed of a vehicle. The method includes obtaining a plurality of GPS coordinates and headings, the GPS coordinates and headings corresponding to a plurality of locations of the vehicle. The method also includes obtaining a reported speed of the vehicle. The method also includes determining, based on two or more of the plurality of GPS coordinates and headings, that the vehicle is traveling straight and at a constant speed. The method also includes calculating a speed correction factor based on the two or more of the plurality of GPS coordinates and headings. The method also includes applying the speed correction factor to the reported vehicle speed to determine a true speed of the vehicle.

In some implementations, the method also includes sending, to a terrain-based localization system, the true speed of the vehicle.

In some implementations, determining that the vehicle is traveling straight comprises determining that a plurality of consecutive vehicle headings differ from one another by less than 2%.

According to another aspect, the present disclosure provides a method of determining a location of a vehicle. The method includes obtaining a plurality of GPS coordinates and headings, the GPS coordinates and headings corresponding to a plurality of locations of the vehicle. The method also includes obtaining a reported vehicle speed of the vehicle. The method also includes determining, based on two or more of the plurality of GPS coordinates and headings, that the vehicle is traveling straight and at a constant speed. The method also includes calculating a speed correction factor based on the two or more of the plurality of GPS coordinates and headings. The method also includes applying the speed correction factor to the reported vehicle speed to determine a true speed of the vehicle. The method also includes determining, based on dead reckoning using the true speed of the vehicle, a location of the vehicle.

In some implementations, determining that the vehicle is traveling straight comprises determining that a plurality of consecutive vehicle headings differ from one another by less than 2%.

Performance Supervisor for Terrain-Based Vehicle Control

According to one aspect, the present disclosure provides a method of monitoring location-based suspension system commands. The method includes obtaining a force command for a suspension actuator of a vehicle. The method also includes obtaining road information for a road on which the vehicle is traveling. The method also includes determining one or more expected ride characteristics of the vehicle. The method also includes sensing, by one or more sensors, one or more actual ride characteristics of the vehicle as the vehicle travels on the road. The method also includes comparing the one or more expected ride characteristics with the one or more actual ride characteristics. The method also includes calculating a relative improvement score based on the comparison of the one or more expected ride characteristics with the one or more actual ride characteristics.

In some implementations, ride characteristics comprise vehicle body accelerations.

In some implementations, the method also includes determining, based on the relative improvement score, that the force command caused performance degradation. In some instances, the method also includes applying a gain to the force command. In some instances, the gain is applied to the force command over a limited frequency range.

In some implementations, the method also includes turning off force commands to the suspension actuator.

In some implementations, the suspension actuator is a semi-active suspension actuator or an active suspension actuator.

In some implementations, obtaining road information comprises using a high precision localization system to determine a road profile of the road.

Real-Time Road Estimator Calibration

According to one aspect, the present disclosure provides a method including obtaining road data from one or more vehicle sensors as a vehicle traverses a road segment. The method also includes determining, by a controller, based on the road data and using a set of parameters relating to the one or more vehicle sensors, an estimated road profile of the road segment. The method also includes obtaining, from a cloud database, a composite road profile of the road segment. The method also includes comparing the estimated road profile of the road segment with the composite road profile of the road segment. The method also includes determining an error between the estimated road profile of the road segment and the composite road profile of the road segment. The method also includes initiating, by the controller, a command to adjust one or more individual parameters within the set of parameters relating to the one or more vehicle sensors.

In some implementations, the one or more vehicle sensors comprises one or more wheel accelerometers.

In some implementations, the one or more vehicle sensors comprises at least one of one or more ride height sensors, one or more body accelerometers, or one or more body IMUs.

In some implementations, the composite road profile is compiled from sensor data from other vehicles previously traversing the road segment. In some instances, the composite road profile is compiled from road data from at least 5 vehicles previously traversing the road segment.

In some implementations, the one or more individual parameters comprises a correction factor on a sensor signal used to create the road data. In some instances, the correction factor comprises different corrections to the sensor signal at different frequencies. In some instances, the one or more sensors comprises a wheel accelerometer and the correction factor comprises a correction to data collected for low frequency road content. In some instances, the one or more sensors comprises a ride height sensor and the correction factor comprises a correction to data collected for high frequency road content. In some instances, the one or more individual parameters comprises a parameter of a physics model of the vehicle. The physics model may be used to fuse sensor information into the road estimate.

Cached Terrain-Based Road Data for Localization & Control

According to one aspect, the disclosure provides a method for operating a vehicle using data stored in a cloud-based database during a trip to a destination. The method may include downloading road surface information, before the trip has commenced, e.g., while the vehicle is parked. The information may be for a predetermined route to be travelled during a future trip. The information may be downloaded to a local information storage unit onboard the vehicle. Once the trip has begun the information may be used to determine the location of the vehicle and/or to control an aspect of a system on the vehicle during the trip. A WiFi or hardwired (e.g., ethernet) communication connection may be used. In some implementations, the vehicle may be an electric vehicle or a plug-in hybrid-electric vehicle and the ethernet connection may be integrated with the charging cable. In some implementations, a microprocessor may determine the road surface data, stored locally, is outdated by providing information, such as the time and date when the data was downloaded, to the data base. If the data is out-of-date, new data may be downloaded that is up-to-date. In some implementations, a microprocessor on the vehicle may determine the destination by accessing a predesignated calendar, a user interface, or a navigation device which may be on a cell phone.

According to another aspect, the disclosure provides a method for operating a vehicle using road surface information previously stored onboard a vehicle. This method may include determining a destination, using a navigation system to determine a route to the destination, determining that the road-surface data for the route is available onboard the vehicle; and using the road-surface data onboard the vehicle, while traveling along the route, to determine the location of the vehicle and/or control an aspect of the operation of a system onboard the vehicle. Under certain circumstances it may be determined that the onboard data is not up-to-date in which case the data may be updated by accessing data from a cloud-based data base.

Maintaining Vehicle Anonymity During Cloud-Based Vehicle Control

According to another aspect, the disclosure provides a method of providing road preview information to a vehicle while maintaining the data privacy of information provided by the vehicle. The method may further include receiving, from the vehicle at a first cloud-based database, information based on data collected by at least one sensor on board the vehicle; receiving, from the vehicle at a first cloud-based database, vehicle-identifying data that identifies the vehicle providing the data; creating a data tag based on the vehicle-identifying data; associating the data tag with at least a portion of the data provided by the vehicle; supplying, to an independent second cloud-based database, at least a portion of the data received, for analysis, and the associated information tag; and receiving, from the independent second cloud-based database, road preview information, wherein the road preview information includes data characterizing at least an aspect of the road ahead of the vehicle. In some implementations, the sensor may be, for example, an accelerometer mounted on an unsprung mass of the vehicle, an accelerometer mounted on a sprung mass of the vehicle, and/or an IMU.

According to another aspect, the disclosure provides a method of providing for the exchanging data with a vehicle while maintaining data privacy. The method may further include receiving a first quantity of sensor data from a vehicle at a first cloud-based data base; receiving information that identifies the vehicle providing the data; generating a data tag for the data provided by the vehicle that is associated with the data; using the data tag instead of the identifying information provided by the vehicle; conveying the data received from the vehicle, and the generated data tag to an independent second cloud-based database; receiving, at the first data base, information from the second database, where the information is associated with the generated tag; and providing information, to the vehicle based that is at least partially based on the information received from the second data base. In some implementations, the data received from the vehicle is related to a performance metric of at least one system in the vehicle and the information to the vehicle is an indication of the level of performance the at least one system. In some implementations, the at least one system is, for example, a braking system, an ABS system, and/or an EPS system.

System Performance Tracking

According to another aspect, the disclosure provides a method of operating a vehicle. The method includes determining a location of a vehicle and determining a value of a quality metric for the location of the vehicle. The method includes comparing the quality metric to an upper bound and a lower bound for the quality metric. The method includes initiating a command to a vehicle subsystem based on the comparison.

In some implementations, the method includes determining that the value of the quality metric is above the upper bound. In some instances, the command initiated to a vehicle subsystem is a full intended command.

In some implementations, the method includes determining that the value of the quality metric is between the upper bound and the lower bound. In some instances, the command initiated to the vehicle subsystem is a scaled command.

In some implementations, the vehicle subsystem is a variable damper system, an active suspension system, an active roll stabilizer system, or a rear steering system.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various nonlimiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in the various figures may be represented by a like numeral. For purposes of clarity, not every component may be labeled in every drawing. In the drawings:

FIG. 11 is a flowchart showing a process of updating a cloud database of road data.

8

Figure 19:
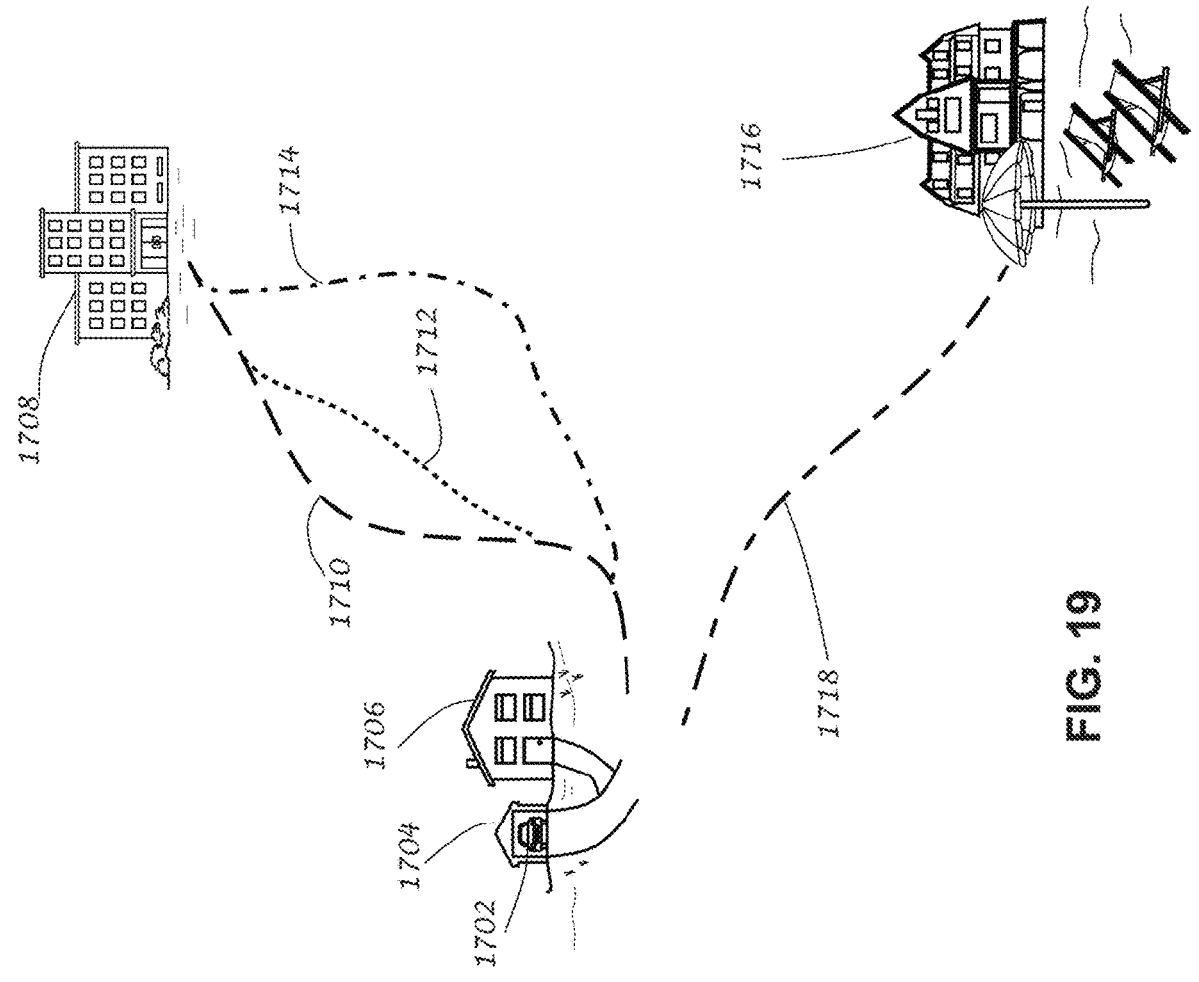

FIG. 19 illustrates vehicle routes to various frequent and non-frequent destinations.

Figure 20:
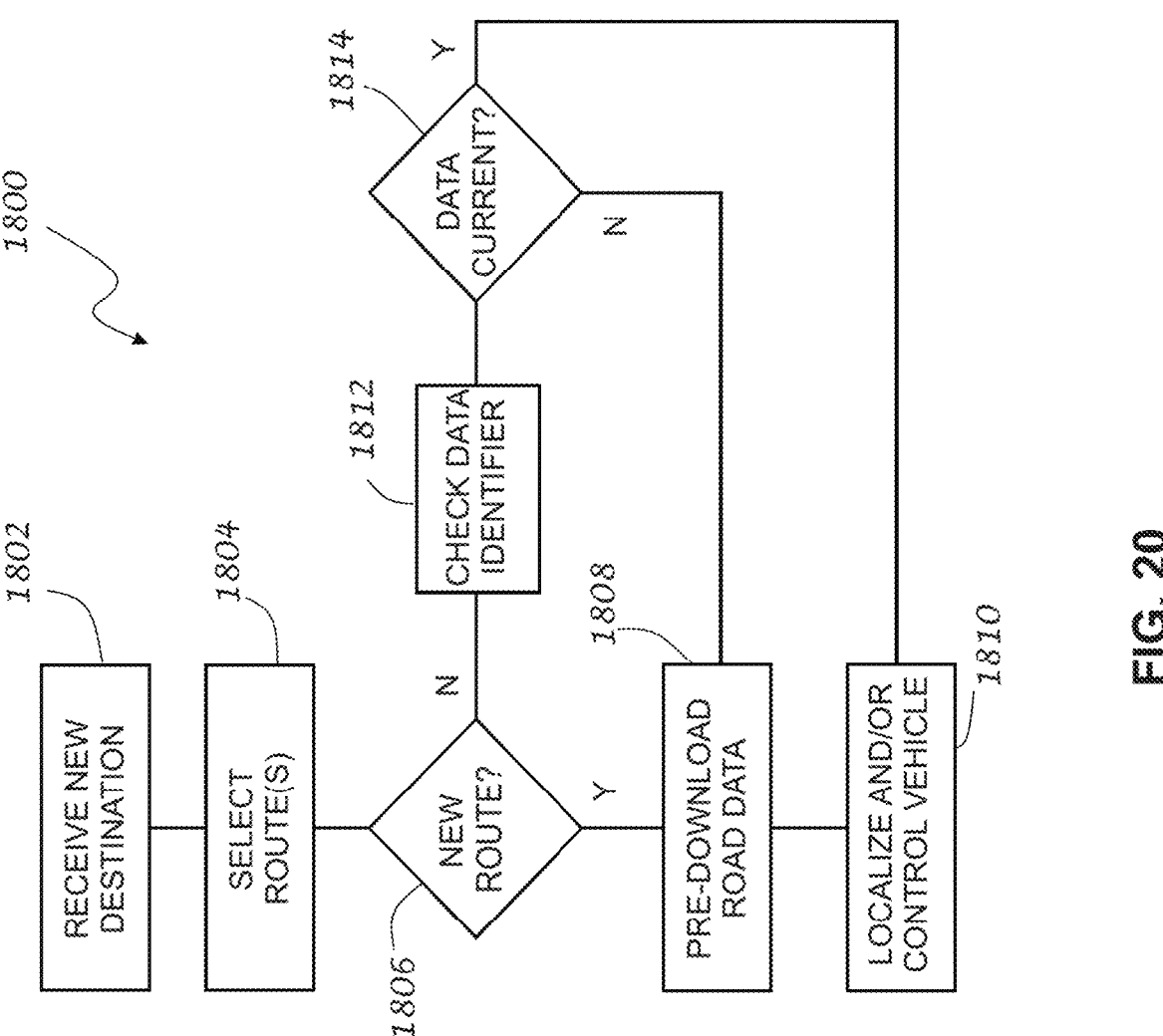

FIG. 20 illustrates a block diagram of the process of downloading road-surface data for a new or infrequent destination.

Figure 21:
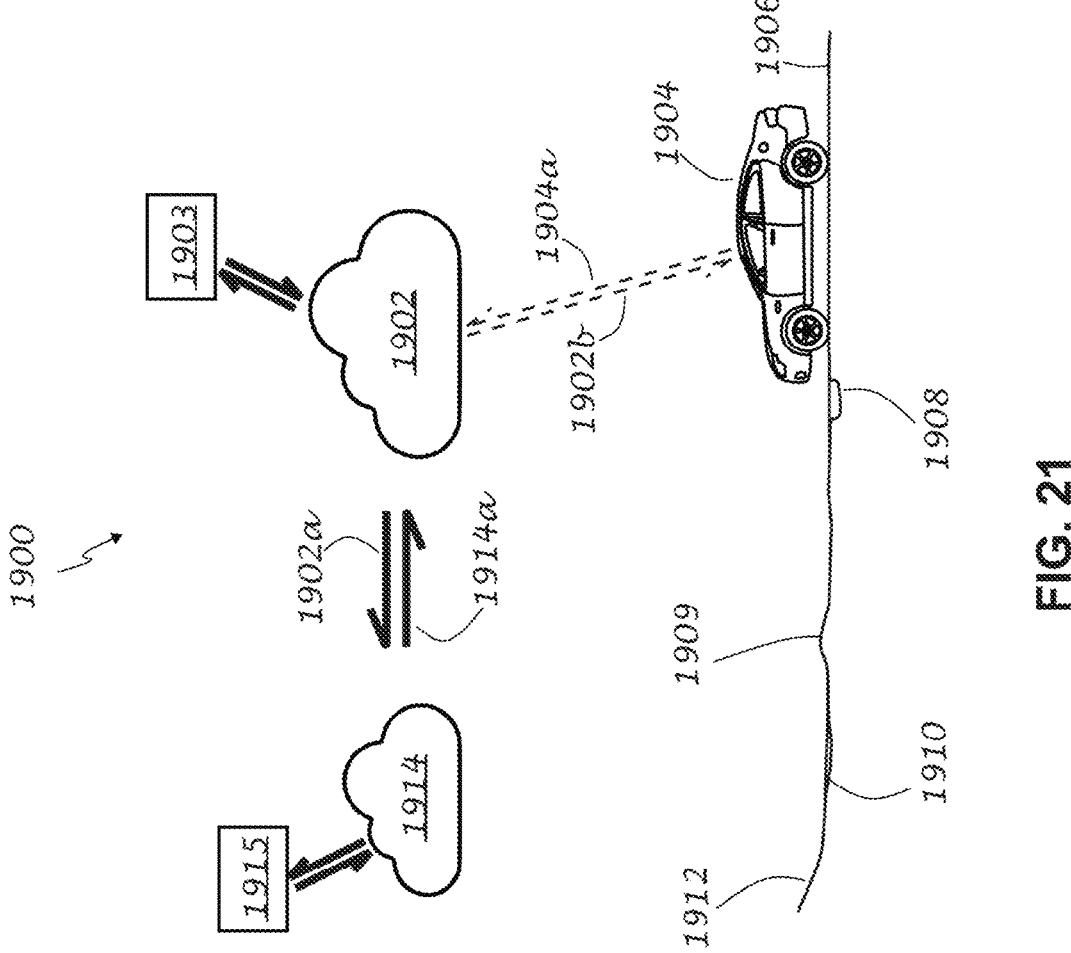

FIG. 21 illustrates a cloud-based vehicle localization and control system where data privacy is maintained.

DETAILED DESCRIPTION

A vehicle traveling along a road, autonomously or under the control of a driver, may interact with one or more road surface features that may expose the vehicle and/or one or more vehicle occupants to certain forces or accelerations. Such road features may affect the comfort of vehicle occupants as well as wear-and-tear of the vehicle. The magnitude, direction, and/or frequency content of such forces or accelerations may be a function of the characteristics of one or more road surface features. A typical road may include various types of road surface features, such as for example, road surface anomalies including, but not limited to potholes, bumps, surface cracks, expansion joints, frost heaves, rough patches, rumble strips, storm grates, etc.; and/or road surface properties, including but not limited to road surface texture, road surface composition, surface camber, surface slope, etc. Road surface properties may affect road surface parameters, such for example, the friction coefficient between the tires of a vehicle and the road, traction and/or road-grip. Such parameters may determine how effectively certain maneuvers, such as turning and stopping, may be performed at various speeds and vehicle loading.

The inventors have recognized the benefits of controlling operation of various systems of a vehicle based on the above-noted road surface properties and features. However, the types and characteristics of road surface features and/or properties may vary, for example, from road to road, as a function of longitudinal and/or lateral location on a given road. The effect of vehicle interaction with a given road surface feature, on the vehicle and/or an occupant, may also vary as a function of vehicle speed at the time of the interaction between the vehicle and the road surface feature. The characteristics of a road surface feature may also vary, for example, based on weather conditions, and/or as a function of time. For example, if the road surface feature is a pothole, it may gradually appear and grow, in length, width, and/or depth, over the winter months as a result of repeated freeze/thaw cycles and then be repaired in a matter of hours or less and effectively disappear. Due to the changing nature, and previously unmapped layout, of a road surface, typically vehicles have sensed the interactions of a vehicle with the road surface and then operated the various autonomous and/or semi-autonomous systems of the vehicle in reaction to the detected characteristics and road surface features the vehicle encounters.

Properties and road surface features of a road surface a vehicle might be driven over can be mapped to provide forward-looking information about the road surface features located along a path of travel of a vehicle. This information about the road surface features ahead of the vehicle may be used to, for example, dynamically tune, prepare, and/or control various automated or partially automated systems in the vehicle (such as for example, suspension systems (e.g., semi or fully active), propulsion systems, adaptive driver assistance systems (ADAS), electric power steering systems (EPS), antilock braking systems (ABS), etc.). The inventors have recognized that when there is a physical interaction between a vehicle and a road surface feature, the vehicle is exposed to one or more perceptible forces that are induced by the interaction. Thus, with a preview of the road ahead, a vehicle controller may more effectively react to road surface features when there is a physical interaction between the road surface feature and the vehicle.

While information about a road surface may be useful for the control of various systems of a vehicle, the inventors have recognized that there are challenges to obtaining and using such road surface information. One such challenge is knowing with sufficient accuracy and resolution the location of the vehicle, so that the information regarding road features ahead of the vehicle may be used to more effectively control the vehicle. For example, if the location of the vehicle is not sufficiently accurate, a vehicle controller may take an action that does not mitigate a physical interaction between the vehicle and the road feature. As another example, if the location of the vehicle is not sufficiently accurate, a vehicle controller may take an action that worsens a physical interaction between the vehicle and the road feature or otherwise worsens a vehicle occupant's comfort. For example, an accuracy on Global Navigation Satellite Systems (GNSS) location tends to be on the order of about 7 m to 30 m. With such an accuracy, a vehicle would not only be unable to tell when a vehicle would interact with a particular road surface feature (e.g., a pothole) but it also would be unable to tell if the vehicle would interact with that road surface feature in any manner.

In view of the above, the inventors have recognized that localization systems and methods incorporating terrain-based localization may offer better resolution than a purely GNSS based system. In a terrain-based localization system, as a vehicle travels along a road, a measured road profile may be obtained by measuring vertical motion of a portion of the vehicle using one or more motion sensors attached to the vehicle. This measured road profile may be compared with a reference road profile, and based at least in part on this comparison, the position of the vehicle along the road may be determined. However, the inventors have recognized that continuous pattern matching between a measured profile and a reference profile may require substantial data transmission and/or manipulation. That is, a single vehicle may need to stream sufficient road information such that the measured road profile may be continuously compared to the reference road profile while the vehicle is controlled based on the forward road information. The network bandwidth requirements may be substantial for a system employing a plurality of vehicles across an entire road network such that implementing such a network may not be commercially feasible. Additionally, continuous pattern matching between a measured profile and a reference profile may require computing power beyond what is commercially feasible to employ in a vehicle. If the computation is done remotely, such continuous pattern matching further requires network bandwidth which may already be commercially unfeasible.

In view of the above, the inventors have recognized the benefits of a road segment organizational structure for road information and related methods that provide accurate terrain-based localization in a discretized manner, thereby reducing network and computational requirements to implement terrain-based localization. Each road segment may have a predetermined length, such that a road is broken into multiple road segments. As a vehicle approaches an end point of a road segment, a road profile of the road segment may be compared with the last portion of a measured road profile with an approximately equivalent length. In this manner, a vehicle may verify its precise position based on terrain once per road segment of a predetermined length, a method which is less computationally and network bandwidth intensive.

The inventors have recognized that, given computational and/or bandwidth limitations, it may be advantageous to implement a terrain-based localization method such that the comparison between observed data and reference data occurs only at predetermined intervals (e.g., time or distance intervals). However, in between these precise determinations of a vehicle's location using terrain-based localization, a vehicle's location may become less certain as the vehicle travels further away from the last recognized road surface feature. Thus, in certain embodiments, in between these predetermined intervals and/or road surface locations, dead-reckoning may be used to estimate the location of the vehicle (e.g., the position of the vehicle along a road) based on the previously identified location (e.g., the previously identified position along the road). For example, in certain embodiments and as described in detail herein, a terrain-based localization method may include first collecting, as a vehicle travels along a road, data from one or more sensors attached to the vehicle. The collected data may be processed (e.g., transformed from time to distance domain, filtered, etc.) to obtain measured data (e.g., a measured road profile). The measured data may then be compared with reference data associated with the road (e.g., a reference or stored road profile) and, based at least in part on this first comparison, a position of the vehicle along the road at a first point in time may be determined. Once the position of the vehicle along the road at the first point in time is determined, dead reckoning may be used to track the vehicle's position as it subsequently travels along the road. During the period of dead reckoning, new data from the one or more sensors may be collected and optionally processed to yield new observed data. In certain embodiments, upon determining that the vehicle has traveled a predetermined distance since the first point in time, the new observed data may be compared with reference data. Based at least upon this second comparison, the position of the vehicle along the road at a second point in time may be determined. The process may then be repeated as the vehicle traverses sequentially located road segments, such that dead reckoning is used to track further movement of the vehicle, until it is determined that the vehicle has traveled the predetermined distance since the second point in time the location was determined. Upon this determination, terrain-based localization may be used to localize the vehicle at a third point in time. Thus, in some embodiments comparisons may be carried out intermittently at predetermined distance intervals, which may be constant intervals, instead of continuously comparing measured (e.g., the collected data and/or the processed data) data with reference data. Alternatively or additionally, terrain-based localization may be carried out upon determining that a predetermined time interval has passed since the first or previous point in time, rather than a predetermined distance interval. During these time/distance intervals, dead-reckoning may be used, exclusively or in addition to other localization systems that may be used to track the location (e.g., coordinates or position) of the vehicle based on a previously established location. Additionally, while the use of constant time and/or distance intervals are primarily disclosed herein, it should be understood that predetermined time and/or distance intervals used when determining a vehicle's location on different road segments may either be constant and/or variable between each other along different road segments as the disclosure is not limited in this fashion.

The inventors have also recognized that terrain-based determination of location for a vehicle may be supplemented by GNSS location estimations and the use of discretized road segments. That is, rather than using dead reckoning to perform terrain-based comparisons in discrete time and/or distance intervals, a location estimation from a GNSS system may be employed. For example, in certain embodiments and as described in detail herein, a terrain-based localization method may include first collecting, as a vehicle travels along a road, data from one or more sensors attached to the vehicle. The collected data may be processed (e.g., transformed from time to distance domain, filtered, etc.) to obtain measured data (e.g., a measured road profile). The measured data may then be compared with reference data associated with the road (e.g., a reference or stored road profile) and, based at least in part on this first comparison, a position of the vehicle along the road at a first point in time may be determined. Once the position of the vehicle along the road at the first point in time is determined, a GNSS may be used to track the vehicle's position as it subsequently travels along the road which may be used to determine a distance the vehicle has traveled along the road since the vehicle location was determined. During the period of GNSS tracking, new data from the one or more sensors may be collected and optionally processed to yield new observed data. In certain embodiments, upon determining that the vehicle has traveled a predetermined distance since the first point in time based at least in part on the GNSS tracking data, the new observed data may be compared with reference data. Based at least upon this second comparison, the position of the vehicle along the road at a second point in time may be determined. The process may then be repeated, such that GNSS tracking is used to track further movement of the vehicle, until it is determined that the vehicle has traveled the predetermined distance since the second point in time. Upon this determination, terrain-based localization may be used to localize the vehicle at a third point in time. Thus, in some embodiments, comparisons may be carried out intermittently at predetermined distance intervals, which may be constant intervals, or in some instances non-constant predetermined distance intervals associated with the different road segments, instead of continuously comparing measured (e.g., the collected data and/or the processed data) data with reference data. In some cases, employing a GNSS instead of dead reckoning may reduce error related to the predetermined distance. In some embodiments, GNSS may be used in combination with dead reckoning to further reduce error related to the predetermined distance, as the present disclosure is not so limited.

In some embodiments, in a road segment architecture, a given road may be segmented into a series of road segments of predetermined lengths that in some embodiments may be equal to each other, though embodiments in which road segments of unequal predetermined lengths are used are also contemplated. Each road segment may include one or more road profiles that may be employed for terrain-based localization as described herein.

The road profiles may be obtained by measuring vertical motion of a portion of a vehicle using one or more motion sensors attached to the vehicle as the vehicle traverses the road segment. The road segments of predetermined equal lengths or unequal lengths may be referred to as "slices". In certain embodiments, consecutive road segments may be arranged in a contiguous fashion such that the end point of one road segment approximately coincides with the starting point of a subsequent road segment. In some embodiments, the consecutive road segments may be non-overlapping, such that an end point of one road segment coincides with a starting point of a subsequent road segment. Alternatively, in some embodiments, road segments may overlap, such that the start point of a subsequent road segment may be located within the boundaries of a previous road segment. Road segments may be, for example, any appropriate length, including, but not limited to, ranges between any combination of the following lengths: 20 meters, 40 meters, 50 meters, 60 meters, 80 meters, 100 meters, 120 meters, 200 meters or greater. In some embodiments, a road segment may have a length between 20 and 200 meters, 20 and 120 meters, 40 and 80 meters, 50 and 200 meters, and/or any other appropriate range of lengths. Other lengths that are longer or shorter than these lengths are also contemplated, as the present disclosure is not so limited. In certain embodiments, the length of the road segment into which a road is divided may depend on the type of road and/or the average speed travelled by vehicles on the road or other appropriate considerations. For example, on a single lane city road, vehicles may generally travel at relatively low rates of speed as compared to multilane highways. Therefore, on a city road (or other road with relatively low travel speeds) it may be advantageous or otherwise desirable to have relatively shorter road segments (e.g., between 20 and 60 meters) than on highways or other roads with relatively high travel speeds (e.g., between 80 and 120 meters), such that each road segment may correspond to an approximate average travel time from start to end of the road segment regardless of average travel speed on the road.

In some embodiments, a method of localizing a vehicle using road segments includes measuring a road profile with a vehicle. The method may also include determining is a vehicle is within a threshold distance of a road segment end point. For example, in some embodiments, determining the vehicle is within a threshold distance of a road segment endpoint includes estimating a location of the vehicle with a GNSS, dead reckoning from a last known vehicle location, and/or any other appropriate localization method. The method may also include comparing a reference road profile corresponding to the end portion of the road segment along a vehicle's path of travel to the measured road profile. In some embodiments, a last portion of the measured road profile may be compared to the reference road profile as the vehicle traverses the road segment, where the last portion of the measured road profile and reference road profile have approximately equal (e.g., equal) lengths. The method may include determining a correlation between the measured road profile and the reference road profile, for example, using a cross-correlation function or another appropriate function that assesses similarity between the measured road profile and the reference road profile (e.g., dynamic time warping, etc.). The method may also include determining if the correlation between the measured road profile and the reference road profile exceeds a threshold correlation. The threshold correlation may be predetermined based at least in part on a road type, as will be discussed in detail further below. If the correlation exceeds the threshold correlation, the location of the vehicle may be determined, as the position of the vehicle may correspond to the location of the road segment end point. If the correlation does not exceed the threshold correlation, the location of the vehicle may not be determined, and the method may continue with the vehicle advancing down the road and re-determining a correlation between the measured road profile (including additional data measured while advancing down the road) and the reference road profile. In addition to the above, as the vehicle approaches the endpoint of the last portion of the road profile, the correlation between the measured road profile and the reference road profile may increase to a peak at a location corresponding approximately to the endpoint of the reference road profile. Accordingly, in some embodiments, the method may include detecting a peak in the correlation between the measured road profile and the reference road profile while the vehicle moves through an area within a threshold distance of the road segment end point. Additional details of such peak detection are discussed in further detail below.

The various embodiments disclosed herein are related to determining the location of a vehicle on a road surface and/or for creating maps of road segments including information that may be used to locate a vehicle on a road surface. Such information may provide a priori information to a vehicle about one or more road surface features and/or road surface properties located on the road segment along an upcoming portion of the path of travel of the vehicle. As noted previously, by knowing this information prior to the vehicle encountering a given portion of a road segment, operation of one or more systems of a vehicle, e.g., autonomous and/or semi-autonomous systems of the vehicle, may be at least partly controlled based on this information. Accordingly, any of the embodiments disclosed herein may provide information, e.g. vehicle, road surface feature, and/or road parameter locations, that may be used by one or more vehicles to control one or more vehicle systems. Thus, in some embodiments, one or more systems of a vehicle may be controlled based at least in part on a determined location of a vehicle, dead reckoning, a reference profile of a road segment, and combinations of the foregoing. Examples of systems that may be controlled may include suspension systems (semi or fully active), propulsion system, advanced driver assistance systems (ADAS), electric power steering (EPS), antilock braking systems (ABS), navigation systems of autonomous vehicles, and/or any other appropriate type of vehicle system.

According to exemplary embodiments described herein, a vehicle may include one or more wheels and one or more vehicle systems that are controlled by a vehicle control system. A vehicle control system may be operated by one or more processors. The one or more processors may be configured to execute computer readable instructions stored in volatile or non-volatile computer readable memory that when executed perform any of the methods disclosed herein. The one or more processors may communicate with one or more actuators associated with various systems of the vehicle (e.g., braking system, active or semi-active suspension system, driver assistance system, etc.) to control activation, movement, or other operating parameter of the various systems of the vehicle. The one or more processors may receive information from one or more sensors that provide feedback regarding the various portions of the vehicle. For example, the one or more processors may receive location information regarding the vehicle from a Global Navigation Satellite System (GNSS) such as a global positioning system or other positioning system. The sensors on board the vehicle may include, but are not limited to, wheel rotation speed sensors, inertial measurement units (IMUs), optical sensors (e.g., cameras, LIDAR), radar, suspension position sensors, gyroscopes, etc. In this manner, the vehicle control system may implement proportional control, integral control, derivative control, a combination thereof (e.g., PID control), or other control strategies of various systems of the vehicle. Other feedback or feedforward control schemes are also contemplated, and the present disclosure is not limited in this regard. Any suitable sensors in any desirable quantities may be employed to provide feedback information to the one or more processors. It should be noted that while exemplary embodiments described herein may be described with reference to a single processor, any suitable number of processors may be employed as a part of a vehicle, as the present disclosure is not so limited.

According to exemplary embodiments described herein, one or more processors of a vehicle may also communicate with other controllers, computers, and/or processors on a local area network, wide area network, or internet using an appropriate wireless or wired communication protocol. For example, one or more processors of a vehicle may communicate wirelessly using any suitable protocol, including, but not limited to, WiFi, GSM, GPRS, EDGE, HSPA, CDMA, and UMTS. Of course, any suitable communication protocol may be employed, as the present disclosure is not so limited. For example, the one or more processors may communicate with one or more servers from which the one or more processors may access road segment information. In some embodiments, one or more servers may include one more server processors configured to communicate in two-way communication with one or more vehicles. The one or more servers may be configured to receive road profile information from the one or more vehicles, and store and/or utilize that road profile information to form road segment information. The one or more servers may also be configured to send reference road profile information to one or more vehicles, such that a vehicle may employ terrain-based localization according to exemplary embodiments described herein, and one or more vehicle systems may be controlled or one or more parameters of the one and/or more vehicle systems may be adjusted based on forward looking road profile information.

In the various embodiments described herein, in some instances, a method of terrain-based localization may be based on peak detection of a cross-correlation between a reference road profile and a measured road profile as a vehicle passes through a road segment end point. In some embodiments, a measured road profile of a predetermined length approximately equivalent to that of the reference road profile may be cross correlated to the reference road profile once the vehicle enters a threshold range of the road segment end point to obtain a correlation between 0 and 1. In some embodiments, the threshold range of the road segment end point may be less than 15 m, 10 m, 5 m, and/or any other appropriate range. In some embodiments, the threshold range of the road segment end point may be based at least partly on a resolution of a GNSS onboard the vehicle. In such embodiments, the threshold range may be approximately equal (e.g., equal) to the resolution of the GNSS.

According to exemplary embodiments described herein, once a vehicle enters the threshold range of the road segment end point, a cross correlation between the measured road profile and reference road profile may be performed and the correlation determined. If the correlation does not exceed a threshold correlation, the vehicle location may not be determined, and the process of terrain-based localization may continue with the vehicle continuing to move down the road. While the vehicle is within the threshold range of the road segment end point, a correlation may be re-determined effectively continuously (e.g., at each time step) as the measured road profile includes the most recent data from the vehicle and removes the oldest data falling outside of the predetermined length. Each time a correlation is determined, it may be determined if the correlation exceeds the threshold correlation. Once the correlation exceeds the threshold correlation at a given time step, it may be determined that the vehicle was located at the road segment end point at that time step. In some embodiments, a peak detection algorithm may be applied to determine if the correlation between the measured road profile and reference road profile is a maximum correlation. In some such embodiments, a slope of the correlation may be determined between the most recent time step and earlier time steps. In some embodiments, a peak may be determined where the slope is negative, and the correlation is decreasing after the correlation exceeded the threshold correlation. Of course, any suitable peak detection function may be applied, as the present disclosure is not so limited. In some embodiments, a threshold correlation may be greater than or equal to 0.6, 0.7, 0.8, 0.9, and/or any other appropriate value. In some embodiments, the threshold correlation may be based at least party on the type of road segment. For example, a highway or high-speed road may have a greater threshold correlation than a low-speed road where more variations in a path taken by a vehicle may be present. According to this example, in some embodiments, a threshold correlation for a highway may be greater than or equal to 0.8, and a threshold correlation for a non-highway road may be greater than or equal to 0.5.

According to exemplary embodiments described herein, road segment information may be stored in one or more databases onboard a vehicle and/or in one or more remotely located servers. In some embodiments, a database may be contained in non-transitory computer readable memory. In certain embodiments, the database may be stored in memory that is exclusively or partially located remotely (e.g., "in the cloud") from the vehicle, and the database and the vehicle may exchange information via a wireless network (e.g., a cellular network (e.g., 5G, 4G), WiFi, etc.). Alternatively, in some embodiments, the database may be stored in non-transitory memory that is located on the vehicle. In certain embodiments. Road segments may be specific for a direction of travel, such that for "two-way" roads (i.e., roads which support simultaneous travel in opposing directions), there may be a distinct set of road segments for each direction of travel (e.g., a first set of road segments for travel in a first direction and a second set of distinct road segments for travel in a second direction).

As used herein, road profile refers to any appropriate description or characterization of a road surface as a function of distance. For example, a road profile may refer to a road height profile that describes variations of height of a road's surface as a function of distance along a given road segment. Alternatively or additionally, a road profile may refer to mathematically related descriptions of road surface. For example, a road profile may refer to a "road slope" profile that describes road slope as a function of distance along a road segment. A road profile of a road segment may be obtained, for example, by measuring—as a vehicle traverses the road segment—vertical motion (e.g., acceleration data, velocity data, position data) of a portion of the vehicle (e.g., to the vehicle's wheel, wheel assembly, or other part of the unsprung mass; or a portion of the vehicle's sprung mass), and optionally processing this data (e.g., transforming it from time to distance domains based on operating speed, integrating the data with respect to time, filtering it (e.g., to remove wheel hop effects), etc.). For example, if vertical acceleration of a wheel is measured using an accelerometer attached to the wheel, then vertical velocity of the wheel may be obtained through integration, and vertical height obtained through further integration. With knowledge of the operating speed of the vehicle (that is, the speed at which the vehicle traverses the road segment), vertical height with respect to distance travelled may be obtained. In some embodiments, further filtering may be advantageous. In one example, a road height profile may be obtained from the wheel's vertical height data (e.g., as determined by measuring acceleration of the wheel) by applying a notch filter or low-pass filter (to, e.g., measured vertical acceleration of the wheel) to remove effects of wheel hop. A road profile may incorporate information describing or characterizing discrete road surface anomalies such as, for example, potholes (or other "negative" events) and/or bumps (or other "positive" events). Additionally or alternatively, a road profile may incorporate information about distributed road surface characteristics such as road roughness and/or road surface friction.

According to exemplary embodiments described herein, if a vehicle travels on a road (or section of a road) for which no reference road profile data exists, reference data (including, e.g., a reference road profile, characterization of the road's surface, and/or the presence of irregular events such as bumps or portholes) may be generated by collecting motion data from one or more motion sensors (e.g., accelerometers, position sensors, etc.) attached to one or more points of the vehicle (e.g., attached to a wheel of the vehicle, a wheel assembly of the vehicle, a damper, another part of the unsprung mass of the vehicle, or a part of the sprung mass of the vehicle). Data collected from a first traversal of the road or road section may then be used to generate the reference data that may be stored in a database and associated with the particular road segment of the road or road section. Alternatively, data may be collected from a plurality of vehicle traversals and merged (e.g., averaged using a mean, mode, and/or median of the reference data) together to generate reference data.

According to exemplary embodiments described herein, the location of a vehicle may be estimated or at least partially determined by, for example, absolute localization systems such as satellite-based systems. Such systems may be used to provide, for example, absolute geocoordinates (i.e., geographic coordinates on the surface of the earth such as longitude, latitude, and/or altitude) of a vehicle. Satellite based systems, generally referred to as a Global Navigation Satellite System (GNSS), may include a satellite constellation that provides positioning, navigation, and timing (PNT) services on a global or regional basis. While the US based GPS is the most prevalent GNSS, other nations are fielding, or have fielded, their own systems to provide complementary or independent PNT capability. These include, for example: BeiDou/BDS (China), Galileo (Europe), GLONASS (Russia), IRNSS/NavIC (India) and QZSS (Japan). Systems and methods according to exemplary embodiments described herein may employ any suitable GNSS, as the present disclosure is not so limited.

According to exemplary embodiments described herein, dead reckoning may either be used to determine a location of the vehicle at a time point after the vehicle's last known location using the vehicle's measured path of travel and/or displacement from the known location. For example, the distance and direction of travel may be used to determine a path of travel from the known location of the vehicle to determine a current location of the vehicle. Appropriate inputs that may be used to determine a change in location of the vehicle after the last known location of the vehicle may include, but are not limited to, inertial measurement units (IMUs), accelerometers, sensor on steering systems, wheel angle sensors, relative offsets in measured GNSS locations between different time points, and/or any other appropriate sensors and/or inputs that may be used to determine the relative movement of a vehicle on the road surface relative to a previous known location of the vehicle. This general description of dead reckoning may be used with any of the embodiments described herein to determine a location of the vehicle for use with the methods and/or systems disclosed herein.

In some cases, roads may include more than one track (e.g., lane) for each direction of travel, and the road profile may differ for each track. It may not be known in a reference database how many tracks (e.g., lanes) are in a road or road segment, which may lead to difficulties when generating reference data for the road or road section. For example, if a reference road profile for a given road is generated by a vehicle travelling in the left-most lane of a multi-lane road, subsequent attempts to use said reference road profile to localize a vehicle travelling in the right-most lane may fail due to differences in road surface between the left-most lane and the right-most lane. Thus, knowing both how many tracks a road has, and in which track a vehicle is travelling, is desirable for both generating reference road profiles, subsequent localization, and for using the information for controlling a vehicle and/or one or more vehicle systems. Prior attempts at determining a track of a road profile have raised computational challenges, such as data storage for road profiles of multi-lane use (e.g., a lane change) which are not useful for the majority of vehicle traversals of a road segment which occur in a single lane.

In view of the above, the inventors have recognized the benefits of a road segment organizational structure in which multiple road surface profiles may be associated with a single road segment. The road segment structure allows multiple road profiles to be associated with a road segment in a manner that is less data and computationally intensive. Additionally, the inventors have recognized the benefits of a road segment organizational structure which employs a threshold-based approach to collecting and storing road profiles that may be associated with a road track. In particular, the inventors have appreciated that until a sufficiently large number of stored road profiles is reached, clustering and/or merging road profiles may result in inaccurate road profile information.

In some embodiments, a method of identifying a track (e.g., a lane) of a road profile for a road segment includes measuring a road profile of the road segment with any appropriate onboard sensor as disclosed herein as the vehicle traverses the road segment (e.g., employing a vehicle according to exemplary embodiments described herein). A measured road profile may be transmitted to a server each time a vehicle traverses the road segment, such that a plurality of vehicles may transmit a plurality of measured road profiles to the server. The method may also include determining if the number of stored road profiles exceeds a threshold number of road profiles. The threshold number of road profiles may be predetermined to allow a sufficient number of road profiles to be collected prior to data manipulation. In some cases, the threshold number of road profiles may be based on the type of road segment. For example, a high-speed road such as a highway may have a greater threshold number of road profiles as highways typically include more lanes than low speed roads. In some embodiments, the threshold number of road profiles may be between 2 and 64 road profiles, between 8 and 12 road profiles, and/or any other suitable number. If the server receives a road profile from the vehicle and the threshold number of stored road profiles is not exceeded, the received measured road profile may be stored and associated with the road segment. However, if the threshold number of road profiles is exceeded by the received measured road profile, the method may include identifying the most similar two road profiles of the measured road profile and stored road profiles. The most similar two road profiles may be identified based on a cross-correlation function performed on each pair of road profiles, and comparing the resulting degree of similarity values. If the degree of similarity of the two most similar road profiles exceeds a predetermined similarity threshold, the two most similar road profiles may be merged into a merged road profile. If the degree of similarity of the two most similar profiles does not exceed a similarity threshold, the oldest road profile may be discarded, and the newly measured road profile stored. In this manner, similar road profiles may be retained by the server, whereas outlying road profiles will be eventually removed. As similar road profiles are merged, information regarding how many road profiles have been merged into a single merged profile may be kept as metadata, with greater numbers of road profiles in a single merged profile representing a track (e.g., lane) of a road segment.

In some embodiments, a degree of similarity may be a value between 0 and 1 which is the output of a cross-correlation function. In some embodiments, a similarity threshold for merging road profiles may be greater than or equal to 0.6, 0.7, 0.8, 0.9, and/or any other appropriate value. In some embodiments, the similarity threshold may be based at least party on the type of road segment. For example, a highway or high-speed road may have a greater threshold correlation than a low-speed road where more variations in a path taken by a vehicle may be present. According to this example, in some embodiments, a threshold correlation for a highway may be greater than or equal to 0.8, and threshold correlation for a non-highway road may be greater than or equal to 0.5.

In some embodiments, if a set of road profiles includes a sufficiently large number of road profiles (e.g., exceeding a threshold number of road profiles), a correlation clustering algorithm is conducted on the set of road profiles. A number of appropriate correlation clustering algorithms are known in the art, including, for example, hierarchal or partitional clustering methods (e.g., k-means clustering, c-means clustering, principal component analysis, hierarchal agglomerative clustering, divisive clustering, Bayesian clustering, spectral clustering, density-based clustering, etc.) Subsequent to a correlation clustering process, the set of road profiles may be divided into one or more clusters, where each road profile contained within a given cluster is substantially similar to each other road profile contained within the given cluster. For example, the set of road profiles in a road segment may be divided into at least a first cluster of road profiles and a second cluster of road profiles, where each road profile in the first cluster is substantially similar to each other road profile in the first cluster, and each road profile in the second cluster is substantially similar to each other road profile in the second cluster. In some embodiments, a similarity of the plurality of road profiles in each cluster may be more similar to other road profiles in the same road profile as compared to road profiles in other clusters as determined using any appropriate comparison method including, for example, a cross correlation function as described herein. In certain embodiments, each cluster may be considered as corresponding to a track (e.g., a lane) of the road, road segment, or road segment. In certain embodiments, all of the road profiles within a given cluster may be merged (e.g., averaged), in order to obtain a single track-merged road profile. This merged road profile may serve as the reference road profile for a given track within a road segment (e.g., for future terrain-based localization or future preview control of vehicles (e.g., controlling one or more vehicular systems based on knowledge of upcoming road characteristics)), and may be stored in the database and associated with a specific track in a road segment. This merging may be carried out for each identified cluster. In certain embodiments, the clustering algorithm may be periodically repeated (e.g., after a certain number of new road profiles are collected for a given road segment), Alternatively, the clustering algorithm may be repeated after each new road profile is collected to determine which cluster the new profile belongs in.

In some embodiments, rather than considering each cluster to correspond to a track, only clusters having a number of road profiles that exceed a threshold number of road profiles are considered to correspond to tracks. A track represents a path that vehicles take when traversing a road segment. For example, a cluster with a single road profile or a small number of profiles less than the threshold number of road profiles, may be considered an outlier, rather than a separate track. Outliers may occur, for example, when a vehicle experiences an atypical event while traversing a road segment (e.g., the vehicle may change lanes within a road segment, or may traverse some temporary debris or garbage on the road that is not typically present). In certain embodiments, road profiles considered outliers may be deleted after some amount of time in order to save space, not cause confusion, or other appropriate reasons.

According to exemplary embodiments described herein, one or more road profiles may be merged into a merged road profile. In some embodiments, merging two or more road profiles may include averaging the two or more profiles. In some embodiments, merging the two or more road profiles may include accounting for the range of frequencies over which the information provided in a measured road profile is valid. In some instances, two or more measured road profiles may have overlapping, but not identical, valid frequency ranges. In such instances, the overlapping portions may be averaged while the non-overlapping portions may be left unchanged. A reference profile created from multiple overlapping, but not identical, measured road profiles may have a wider valid frequency range than an individual measured road profile. According to such an embodiment, sensors of varying quality and frequency may be merged into a merged profile without distorting the merged road profile, as the most useable data from each measure profile may be combined.

Of course, any suitable technique for merging two or more road profiles may be employed, as the present disclosure is not so limited.

In some embodiments, tracks of consecutive road segments may be linked in the database. These links may form a directed graph showing how tracks on consecutive road segments are visited. For example, a given road may include a first road segment and a second road segment, where the first road segment and second road segment are consecutive. If it is determined that the first road segment contains two tracks (which, in some embodiments, may correspond to physical lanes on a roadway) and the second road segment contains two tracks, each track of the first road segment may be linked in the database to a respective track in the second road segment. This "track linking" may be carried out based on historical trends—for example, if it is observed that a majority of vehicles, or other appropriate threshold, travel from one track (i.e. first road profile) in a first road segment to a corresponding track (i.e. second road profile) in the second road segment those tracks may be linked together in a database containing the road profiles of the various road segments. For example, if vehicles preferably travel from "track 1" in the first road segment to "track 1" in the second road segment, then track 1 of the first road segment may be linked to track 1 in the second road segment. These linkages may be used to predict travel, such that if a vehicle at a given time is localized to "track 1" in the first road segment, it may be assumed that the vehicle is likely to continue to "track 1" in the second road segment. Accordingly, a vehicle may use a track identification to prepare and/or control one or more vehicle systems for an upcoming road profile.

In some embodiments, a road profile may include additional information regarding the vehicle traversal to assist with clustering and/or lane identification according to exemplary embodiments described herein. For example, in some embodiments, a road profile may include an average speed which may be determined by averaging the speeds of vehicles traversing the road segment when measuring the various measured profiles used to determine the road profile. According to such an example, the average speed may assist in lane identification and clustering, as lanes may differ in average speed. For example, in the U.S. a right-most lane may have the lowest average speed whereas the left-most land has the highest average speed. Accordingly, a first track with a lower average speed may be associated with a right-most lane and a second track with a higher average speed may be associated with a left-most lane of a roadway. Of course, any suitable information may be collected and employed to identify a vehicle lane of a road segment, as the present disclosure is not so limited.

As used herein, the term "location" may refer a location of a vehicle expressed in absolute coordinates, or it may refer to a position of a vehicle along a road. A position of a vehicle may be expressed as a distance relative to some feature of a road (e.g., as a distance relative to the start of a road, relative to some intersection, relative to some feature located on the road, etc.).

It should be understood that while specific types of sensors for measuring a road profile are described in the embodiments below, any appropriate type of sensor capable of measuring height variations in the road surface, or other parameters related to height variations of the road surface (e.g., accelerations of one or more portions of a vehicle as it traverses a road surface) may be used as the disclosure is not so limited. For example, inertial measurement units (IMUs), accelerometers, optical sensors (e.g., cameras, LIDAR), radar, suspension position sensors, gyroscopes, and/or any other appropriate type of sensor may be used in the various embodiments disclosed herein to measure a road surface profile of a road segment a vehicle is traversing as the disclosure is not limited in this fashion.

As used herein, an average may refer to any appropriate type of average used with any of the parameters, road profiles, or other characteristics associated with the various embodiments described herein. This may include averages such as a mean, mode, and/or median. However, it should be understood that any appropriate combination of normalization, smoothing, filtering, interpolation, and/or any other appropriate type of data manipulation may be applied to the data to be averaged prior to averaging as the disclosure is not limited in this fashion.

As used herein, a road profile may correspond to a "track" or a "lane", and in some instances these terms may be used interchangeably. As used herein, a "track" may be a path that one or more vehicles take to traverse a road segment. In some embodiments, "clusters" correspond to "tracks" and/or "lanes". In some embodiments, "tracks" correspond to physical "lanes" on a road. In other embodiments, "tracks" do not correspond to physical "lanes" on a road.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Terrain-Based Lane Drift Detection

Figure 1:
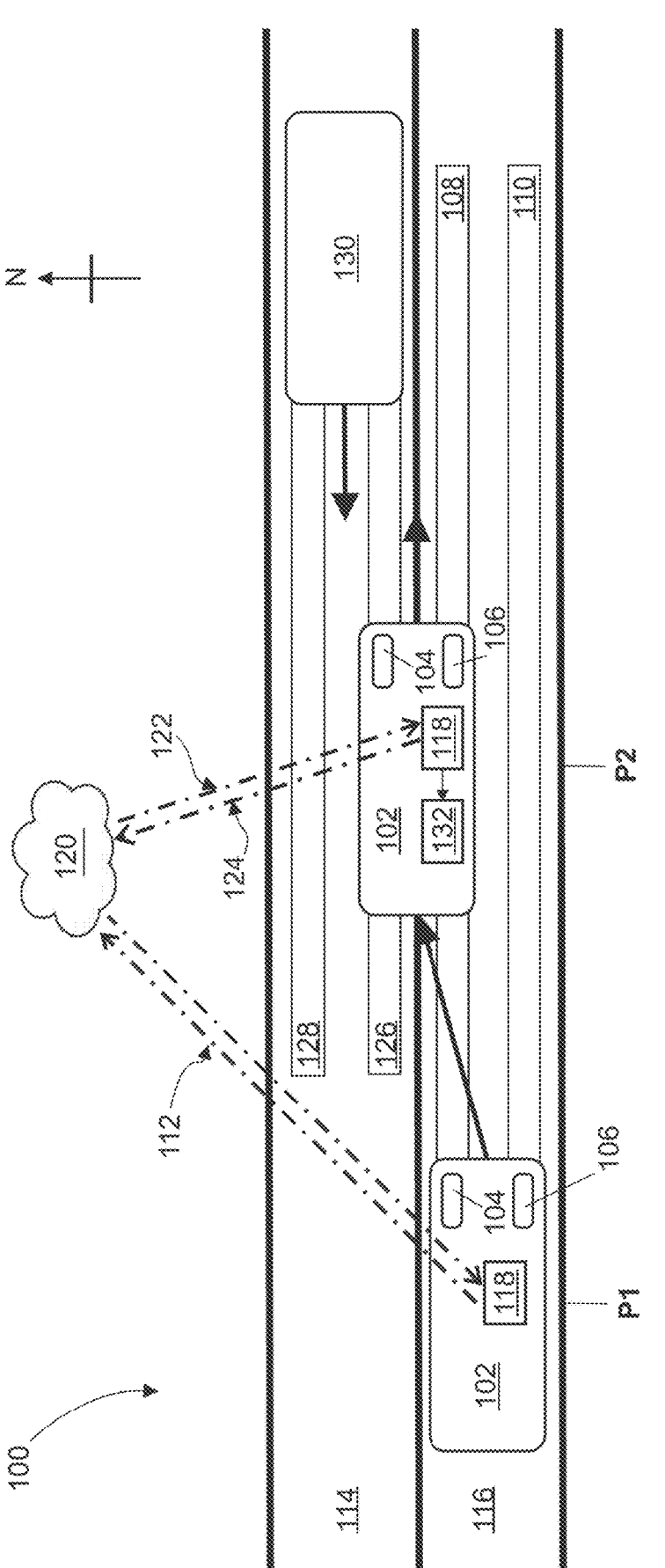
FIG. 1 shows a lane detection system operating in an oncoming traffic lane drift scenario.

Referring to FIG. 1, an oncoming lane drift scenario 100 shows a vehicle 102 traveling, for example, in an eastward lane 116 at position P1. The vehicle 102 has a left wheel 104 and a right wheel 106 which are traveling in the eastward lane 116 on left track 108 and right track 110, respectively. A track is a portion of a road on which one or more wheels of a vehicle may travel. In general, road segments may include multiple tracks which may be laterally offset from one another. A track may be represented by a sequence of road data (e.g., a road profile). As the vehicle 102 travels in the eastward lane 116, sensors on the left wheel 104 and right wheel 106 gather wheel data (e.g., wheel speed, wheel acceleration, etc.). In some implementations, instead of (or in addition to) a wheel sensor (e.g., a wheel accelerometer), a body accelerometer, and/or a body IMU may be used to gather data relating to the right side and left side of the vehicle. It should be understood that such right side and left side data may be used instead of or in addition to road data gathered by wheel sensors (sometimes referred to as wheel data), as described herein. The wheel data from both the left wheel 104 and the right wheel 106 is compared, by a controller 118, to road profile data from a cloud database 120 to localize the vehicle 102 on the road surface. The controller 118 and the cloud database 120 may communicate (represented by arrow 112) with one another to send and/or receive data. When the current left wheel data matches previously obtained road profile data for left track 108 and the current right wheel data matches previously obtained road profile for right track 110, the vehicle 102 can be localized to eastward lane 116.

Figure 4:
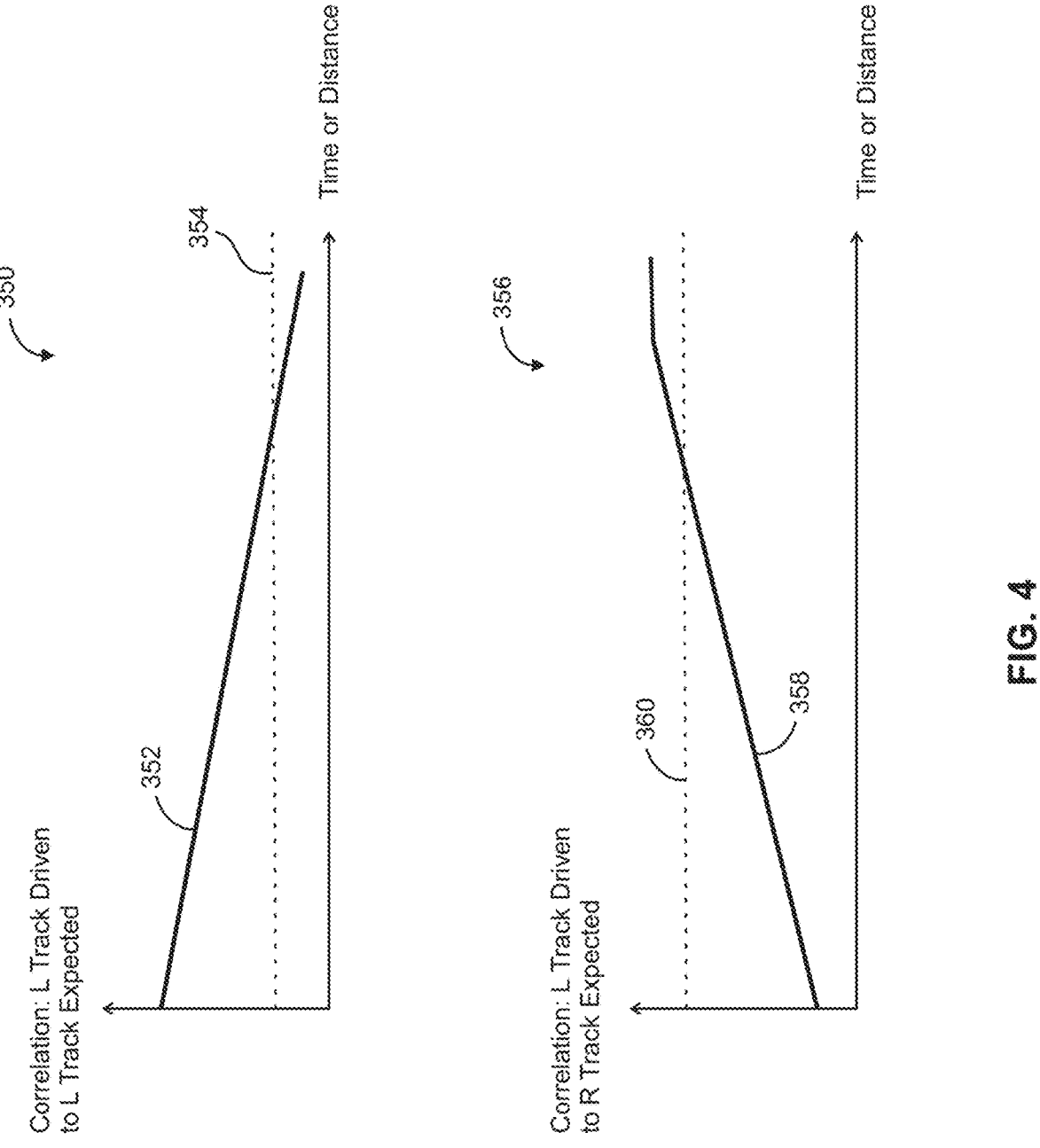
FIG. 4 shows two graphs of correlations between driven and expected tracks during a lane drift maneuver.

In some implementations, as the vehicle 102 begins to drift into westward lane 114 as the vehicle 102 moves from position P1 to position P2, the left wheel data and right wheel data may no longer match road profiles for the left track 108 and the right track 110 of eastward lane 116. During the lane drift, as the vehicle 102 loses the match between wheel data gathered by sensors corresponding to wheels 104 and 106 and tracks 108 and 110, respectively, the controller 118 of the vehicle 102 may request (represented by arrow 124) more road profile information from the cloud database 120. FIG. 4. and its related description discuss losing a match in further detail. Additional road profile information may be sent (represented by arrow 122) by the cloud database 120 to the controller 118 and may include road profile information for adjacent lanes (here, such road profile information may include information on westward lane 114). In FIG. 1, road profile information for the oncoming westward lane 114, including information on a left track 126 and a right track 128 corresponding to westward lane 114, may be included in the additional road profile information. Clustering and tagging techniques may be used to organize tracks in relation to one other (e.g., within physical lanes, in adjacent lanes, laterally offset from one another, etc.), within the cloud database, as previously discussed.

In some implementations, the terrain-based lane drift detection system may perform a cross correlation between current data collected that represents left wheel 104 and/or right wheel 106 and data from multiple candidate tracks (e.g., tracks 108, 110, 126, 128) to determine if there is a match. The candidate tracks may be selected based on a general location of the vehicle, which, in some instances, may be a GPS location of the vehicle. The data representing the left wheel 104 and/or the right wheel 106 is said to match a single track of the multiple tracks when the correlation is above a threshold. The threshold may be set based, at least in part, on the uniqueness of the multiple candidate tracks from one another. For example, in a lane or a road with a lot of lateral uniqueness, the threshold for correlation to determine a match may be lower than the threshold for correlation to determine a match in a lane or on a road with less lateral uniqueness. The terrain-based lane drift detection system may dynamically very the threshold based on knowledge of the road profiles of each of the multiple tracks with each other as the vehicle travels along the road segment or across multiple road segments.

In some implementations, data from the tracks (e.g., tracks 108, 110, 126, 128) may be reversed to determine potential matching with tracks of an opposite direction lane. Reversing a track means that road data of the track is sequenced in the opposite direction from the expected vehicular travel in the lane in which the track is located. For example, a vehicle 130 travels westward in lane 114. Sequencing road data for track 126 typically proceeds from east to west (i.e., in the order that the vehicle 130 will experience the road), while sequencing track 126 in reverse would sequence road data from west to east (i.e., in the opposite order that the vehicle 130 would experience the road).

For the vehicle 102, which is depicted as traveling eastward in lane 116, data from left track 126 and right track 128 may be sequenced in reverse to determine if there is a match with wheel data gathered by sensors corresponding to wheels 104 and 106 of the vehicle 102. As shown in FIG. 1, for example, as the vehicle 102 moves from position P1, to position P2, while drifting from eastward lane 116 into westward lane 114, data corresponding to left wheel 104 and data corresponding to right wheel 106 may change from matching with a right track 110 and a left track 108, respectively, at position P1 to matching with track 108 and a reverse of track 126, respectively, at position P2. In such an instance, when the controller 118 determines that the vehicle 102 is matching reverse track 126, the controller 118 may identify the behavior as a lane drift and may send a message to another vehicle system 132 (e.g., an ADAS, an autonomous vehicle controller, etc.) that a lane drift behavior may be occurring. Communication between the controller 118 and the cloud database 120 (represented by arrows 122 and 124) may enable identification of a lane drift behavior.

In some instances, a lane drift may be treated as an intermediary step in a lane change maneuver. For example, on a multi-lane road, if a driver initiates a left turn signal, the terrain-based localization system determines that there is a same-travel direction lane to the left, and the terrain-based lane drift detection system determines a lane drift to the left, the other vehicle system may not display a warning message as the lane drift is determined to be an intermediary step of a desired lane change maneuver. In some implementations, the controller 118 may compare a previous position of the vehicle 102 to a current position of the vehicle 102 to determine if the maneuver has completed, is completing, or is ongoing.

Figure 2:
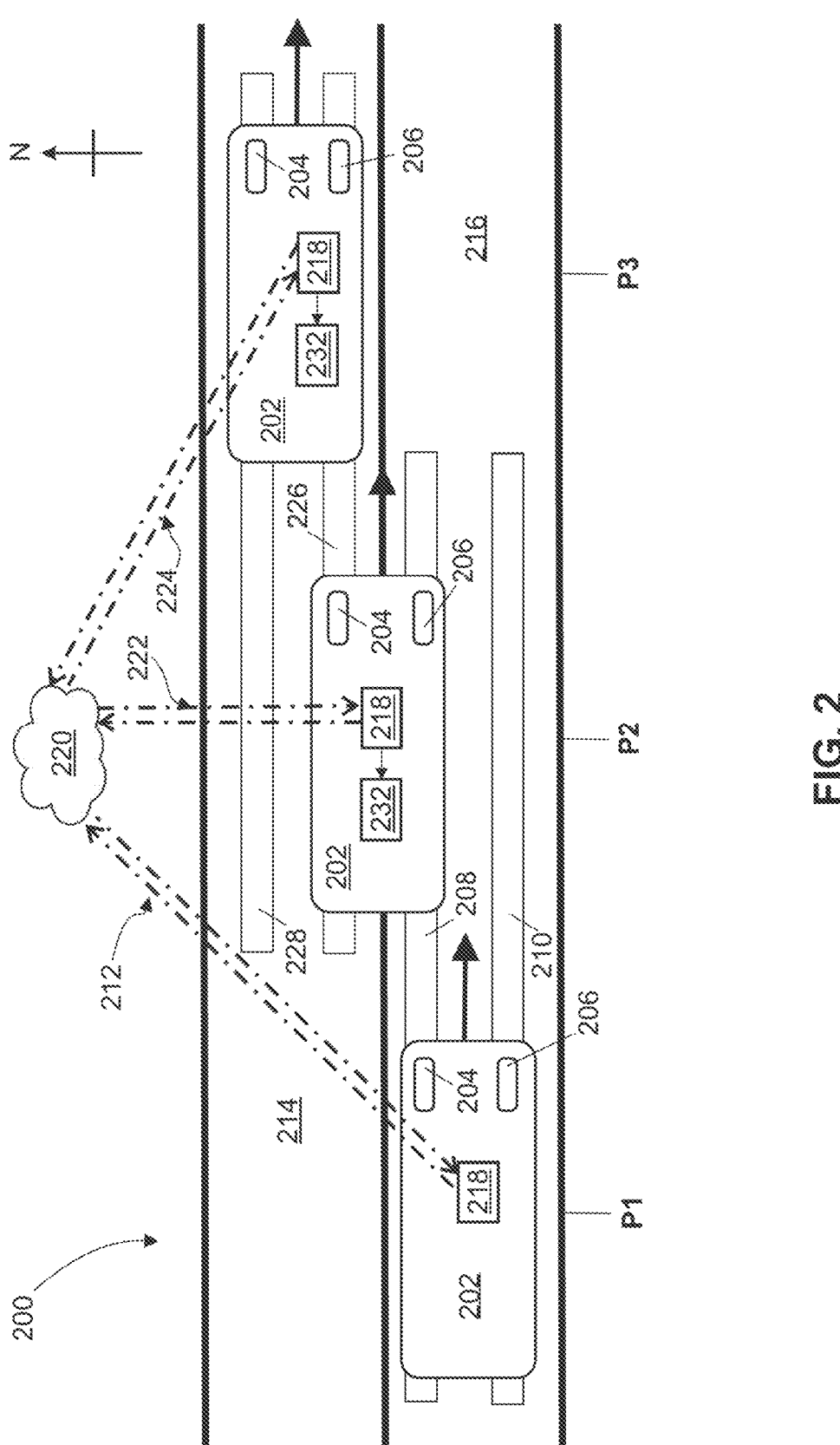
FIG. 2 shows a lane detection system operating in a multi-lane lane drift scenario.

Referring to FIG. 2, a vehicle 202 may be traveling in an eastward lane 216 with a left wheel 204 traveling on a left track 208 and a right wheel 206 traveling on a right track 210. As the vehicle 202 travels in the eastward lane 216, sensors on the left wheel 204 and right wheel 206 gather wheel data (e.g., wheel speed, wheel acceleration, etc.). In some implementations, instead of (or in addition to) a wheel sensor (e.g., a wheel accelerometer), a body accelerometer, and/or a body IMU may be used to gather data relating to the right side and left side of the vehicle. It should be understood that such right side and left side data may be used instead of or in addition to road data gathered by wheel sensors (sometimes referred to as wheel data), as described herein. A controller 218 of the vehicle communicates with a cloud database 220 to obtain road profile information of candidate tracks (i.e., tracks that may be in the same general location as the vehicle 202). Potentially matching tracks being located at the same general location may mean that the tracks are close enough together to be within the limits of GPS accuracy. The controller 218 compares the obtained road profile data with road data gathered by sensors on the wheels 204 and 206 to determine a track that each wheel is traveling on and the longitudinal location of the wheel on that track. For example, in FIG. 2, at position P1, the terrain-based localization system may determine that left wheel 204 is traveling on track 208, the right wheel 206 is traveling on track 210, and that the vehicle 202 is located at longitudinal position P1 along the road segment.

As the vehicle 202 moves to position P2 along the road segment, the controller 218 communicates 222 with the cloud database 220 to determine that data representing left wheel 204 now matches with road profile data of track 226 and data representing right wheel 206 now matches with road profile data of track 208, indicating that the vehicle 202 has drifted partially into eastward lane 214. The controller 218 may inform another vehicle system 232 (e.g., an ADAS, an autonomous vehicle controller, etc.) of the lane drift behavior.

As the vehicle 202 moves from longitudinal position P2 to longitudinal position P3, the controller 218 may communicate 224 with the cloud database 220 and obtain road profile information for tracks 226 and 228. The controller 218 may compare road data gathered by sensors corresponding to the wheels 204 and 206 and compares the currently gathered road data with previously obtained road profiles from the cloud database 220. At position P3, the controller 218 may determine that the vehicle 202 is laterally positioned on tracks 226 and 228 in lane 214 and longitudinally positioned at position P3.

The controller 218 may determine that a lane change maneuver has occurred based on matching current data from wheel 204 with previously obtained data from track 228 and data representing wheel 206 with a road profile of track 226 at longitudinal position P3 after having previously matched data representing wheel 204 with a road profile of track 208 and data representing wheel 206 with a road profile of track 210 at longitudinal position P1. The controller 218 may compare a previous position of the vehicle 202 to determine the maneuver the vehicle has completed, is completing, or is ongoing.

Figure 3:
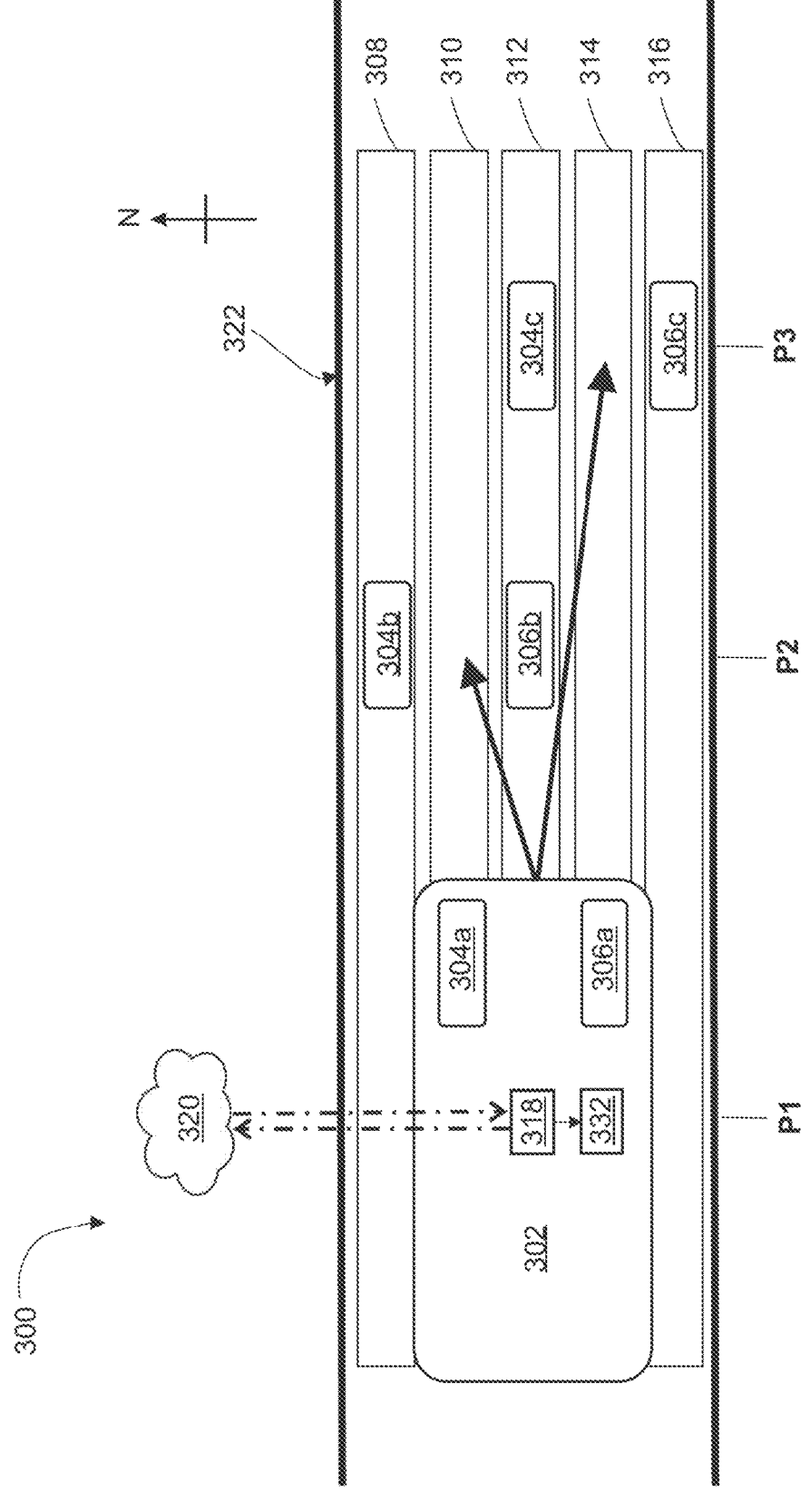
FIG. 3 shows a lane drift detection system operating in an intra-lane lane drift scenario.

Referring to FIG. 3, as a vehicle 302 travels in a lane 322, a terrain-based localization system may determine a lateral position of the vehicle 302 within the lane 322. A controller 318 of the vehicle may communicate with a cloud database 320 as the vehicle 302 travels in the lane 322. Based on currently obtained road data representing wheels 304a and 306a, the controller 318 compares the currently obtained road data with previously obtained road profile data received from the cloud database 320. The road profile data received from the cloud database 320 may include road profile data for multiple tracks within the lane 322. Based on a comparison between the road data currently obtained from the sensors and the previously obtained road profile data received from the cloud database 320, the terrain-based localization system can determine both lateral and longitudinal positions within the lane 322. For example, at longitudinal position P1, the terrain-based localization system determines that the left wheel 304a is laterally positioned in track 310 and the right wheel 306a is laterally positioned in track 314. The terrain-based localization system may determine that this orientation of the vehicle corresponds to the vehicle being in the center of the lane 322.

In some implementations, the controller 318 may determine that the vehicle 302 is not in the center of the lane and may alert another vehicle system 332 (e.g., an ADAS, a lane keep assist system (LKAS), an autonomous driving controller, a semi-autonomous driving controller, etc.) that the vehicle 302 is off-center. In one example, if the wheels 304a and 306a are located at lateral positions 304b and 306b, respectively, as the vehicle 302 is at longitudinal position P2, the controller 318 may determine that the vehicle 302 has drifted to the left. In another example, if the wheels 304a and 306a are located at lateral positions 304c and 306c, respectively, as the vehicle 302 is at longitudinal position P3, the controller 318 may determine that the vehicle 302 has drifted to the right. The controller 318 may notify another vehicle system (e.g., an ADAS, a lane keep assist system (LKAS), an autonomous driving controller, a semi-autonomous driving controller, etc.) that the vehicle 302 is off-center. The other vehicle system 332 may present, on a display, an indication that the vehicle 302 is off-center and/or that corrective steering is required. The driver then may correct this off-center position by steering the vehicle back into the center of the lane. In an autonomous or a semi-autonomous vehicle, the controller 318 may notify an autonomous driving controller or a semi-autonomous driving controller that the vehicle 302 is drifting within the lane 322 so that the controller may adjust course accordingly.

FIG. 4 shows two graphs of correlations between driven and expected tracks during a lane drift maneuver. In the top graph 350, a correlation (represented by line 352) is shown between the left track as driven by the vehicle and the expected left track (i.e., if the vehicle proceeded following the original left track). As the vehicle drifts, the correlation decreases, as the match between the driven left track and the expected left track worsens. When the correlation drops below a threshold 354, a controller may determine that the vehicle is in an ongoing, or has completed, a lane drift maneuver. In some implementations, as the correlation drops toward the threshold, the controller may be able to estimate how much of a lane drift maneuver has been completed, which may be mapped to an amount of lateral travel. The controller may instruct other vehicle systems (e.g., an ADAS, a lane keep assist system (LKAS), an autonomous driving controller, etc.) based on tracking this correlation.

In the Bottom Graph 356 of FIG. 4, a Correlation (Represented by Line 358) is shown between the left track as driven by the vehicle and the expected right track (i.e., if the vehicle proceeded following the original left track, the expected right track would be followed by the right wheels of the vehicle). As the vehicle drifts, the correlation increases as the left wheel of the vehicle moves closer to the expected right track. When the correlation surpasses a threshold 360, a controller may determine that the vehicle is in an ongoing, or has completed, a lane drift maneuver. In some implementations, as the correlation surpasses the threshold 360, the controller may be able to estimate how much of a lane drift maneuver has been completed, which may be mapped to an amount of lateral travel. In some implementations, when the threshold is surpassed, the controller can localize the left wheel of the vehicle on the expected right track. The controller may instruct other vehicle systems (e.g., an ADAS, a lane keep assist system (LKAS), an autonomous driving controller, etc.) based on tracking this correlation.

Location-Based Passing Lane Guidance

In some instances, lane changes may result in a vehicle entering a lane of travel where there may be vehicles traveling in an opposite direction (i.e., where oncoming traffic travels). In some embodiments, by using high precision terrain-based localization, a system may detect that a lane change maneuver has occurred at a precise location and may upload that information, and other vehicle information, to a cloud-based database. The cloud-based database may communicate with a cloud processing system to determine where such lane changes occur at a frequency that is above a certain threshold value and may send that information, and other vehicle information, to individual vehicles. Using many data points and statistical modeling, a lane change warning system may provide alerts and/or warnings to a driver of a vehicle.

Systems and methods described herein may include one or more of the following advantages. Embodiments described herein may leverage statistics and road information, which may include oncoming traffic, weather conditions, time of day, etc. In some implementations, aspects may be executed on a mobile device (e.g., a mobile phone, tablet, etc.), which allows the system to be portable and transferable from car to car. The system uses predictive information and may update that information in real time and may do a simple compare of datapoints, which offers simplicity and robustness. The system may also function in poor visibility conditions where cameras, which may be used in other road analysis systems, may perform poorly. The system may also give a simple, "Yes" or "No", advice on an overtaking maneuver, which allows the driver to easily interpret information. The system has the flexibility to use the vehicle's own statistical information from previous drives (or even from during the active drive) or a combination of the vehicle's own statistical information and crowd sourced information. A driver may be able to switch between these modes in real-time.

Figure 5:
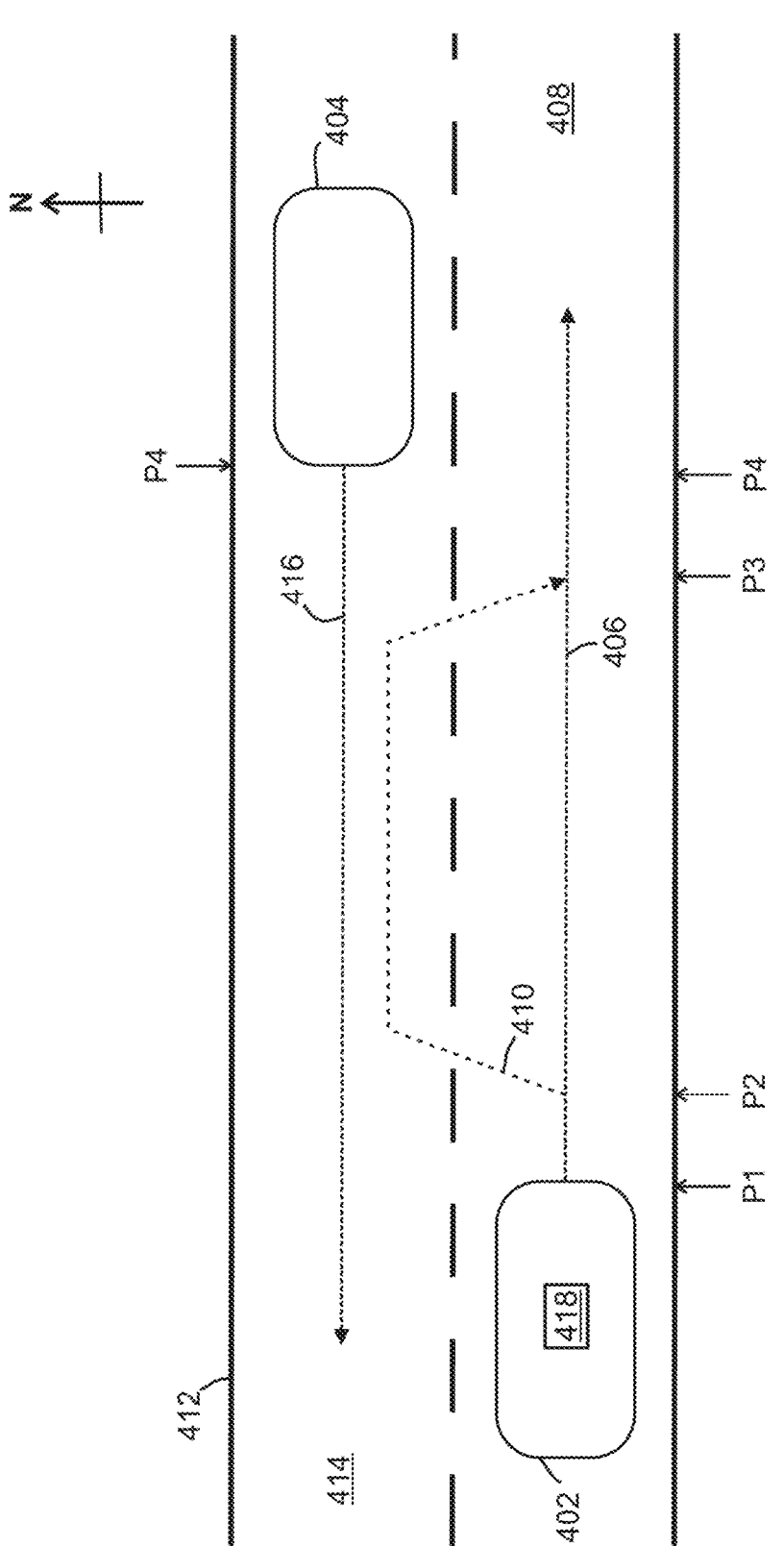
FIG. 5 shows an example of a first vehicle preparing to perform a lane change maneuver near an oncoming vehicle.

As shown in FIG. 5, a vehicle 402 is traveling east along a road 412 along path 406 in a first lane 408. The vehicle 402 may perform a lane change maneuver and take path 410, which takes the vehicle 402 into a second lane 414. When vehicle 402 reaches position P1 in the first lane 408, a controller 418 on the vehicle 402 may present to or otherwise notify (e.g., by an audible sound or tactile alert (e.g., vibration)), a driver of the vehicle 402 via, for example, an advanced driver-assistance system (ADAS), that the vehicle 402 is approaching an overtaking zone. The overtaking zone, starting at position P2 and extending eastward to position P3, is a zone where it is more common, as determined by crowd sourced vehicle data, to perform a lane change maneuver. The ADAS may, under certain circumstances, indicate to the driver of the vehicle 402, when the vehicle has reached position P2, that the overtaking zone has begun. In some implementations, the ADAS may indicate that the overtaking zone begins in a certain amount of distance (e.g., 0.1 miles, 0.2 miles, etc.) or a certain amount of driving time (e.g., 5 seconds, 10 seconds, 30 seconds, etc.). The driving time may be based on a current speed of the vehicle. The ADAS may, under certain circumstances, indicate to the driver that the overtaking zone is ending as the vehicle 402 approaches position P3. In some implementations, the ADAS may indicate that the overtaking zone ends in a certain amount of distance (e.g., 0.1 miles, 0.2 miles, etc.) or a certain amount of driving time (e.g., 5 seconds, 10 seconds, 30 seconds, etc.). The driving time may be based on a current speed of the vehicle. In some implementations, the crowd sourced data used to determine the position of the overtaking zone may indicate that characteristics of the road segment, on which the overtaking zone exists, may be advantageous for performing an overtaking lane change maneuver. For example, the road segment may be straight, may be free from potholes or bumps, may be free from rough pavement, may not collect water or snow frequently, etc.

In some implementations, overtaking zone indications may only be initiated when another vehicle is in front of the vehicle 402 within a threshold distance such that the other vehicle would be passable if safe conditions for passing occur. For example, in situations where no vehicle is present to be potentially passed by the vehicle 402, the overtaking zone indications may be suspended. In some implementations, the overtaking zone indications may be suspended if another vehicle, while within a threshold distance, is traveling at the same rate of speed as the vehicle 402.

Also shown in FIG. 5, a second vehicle 404 is traveling westward along the road 412 on path 416 in the second lane 414, which is an adjacent, but opposite direction, lane to the first lane 408 in which the first vehicle 402 is traveling. As the second vehicle 404 reaches position P4 in lane 414, the second vehicle 404 may present to or otherwise notify a driver, for example, via an ADAS, that the second vehicle 404 is approaching an oncoming overtaking zone. The ADAS may inform the driver of the second vehicle 404 that there is a higher likelihood that an oncoming vehicle may enter lane 414 which may increase collision risk.

In some implementations, the first vehicle 402 and/or the second vehicle 404 may be autonomous vehicles. In such implementations, the presence of an overtaking zone, either in the autonomous vehicle's lane of travel or an oncoming lane, may be sent to an autonomous driving controller of the autonomous vehicle. The autonomous driving controller may utilize the knowledge of the existence of an overtaking zone to determine autonomous driving behavior.

In some implementations, understanding that a lane change behavior has occurred may be important for path prediction and/or determining what data the vehicle consumes. For example, if the vehicle 402 initiates an overtaking lane change maneuver at position P2, thereby following path 410, the vehicle may consume road data for lane 414 while between positions P2 and P3. For example, road data from lane 414 may be consumed by the vehicle 402 to perform motion control, e.g., by changing a position of one or more active suspension actuators on the vehicle 402. In such an instance, the road data from lane 414 would be sequentially reversed so that such road data could be consumed by vehicle 402 traveling in lane 414 in an opposite direction from a typical vehicle (e.g., vehicle 404) traveling in lane 414.

When determining a lane change maneuver has occurred or is occurring, the vehicle 402 may ask the driver and/or a vehicle controller (e.g., if the vehicle is an autonomous or semi-autonomous vehicle) to confirm the lane change maneuver. Detection of a lane change maneuver may be done locally to the vehicle 402 or via communication with a cloud database (e.g., comparing current data to data received by the vehicle from the cloud, uploading data to the cloud and receiving data that a lane change has occurred, etc.). A lane change and overtaking maneuver may be a specific feature or event available in the cloud database or in a database local to the vehicle 402.

Figure 6:
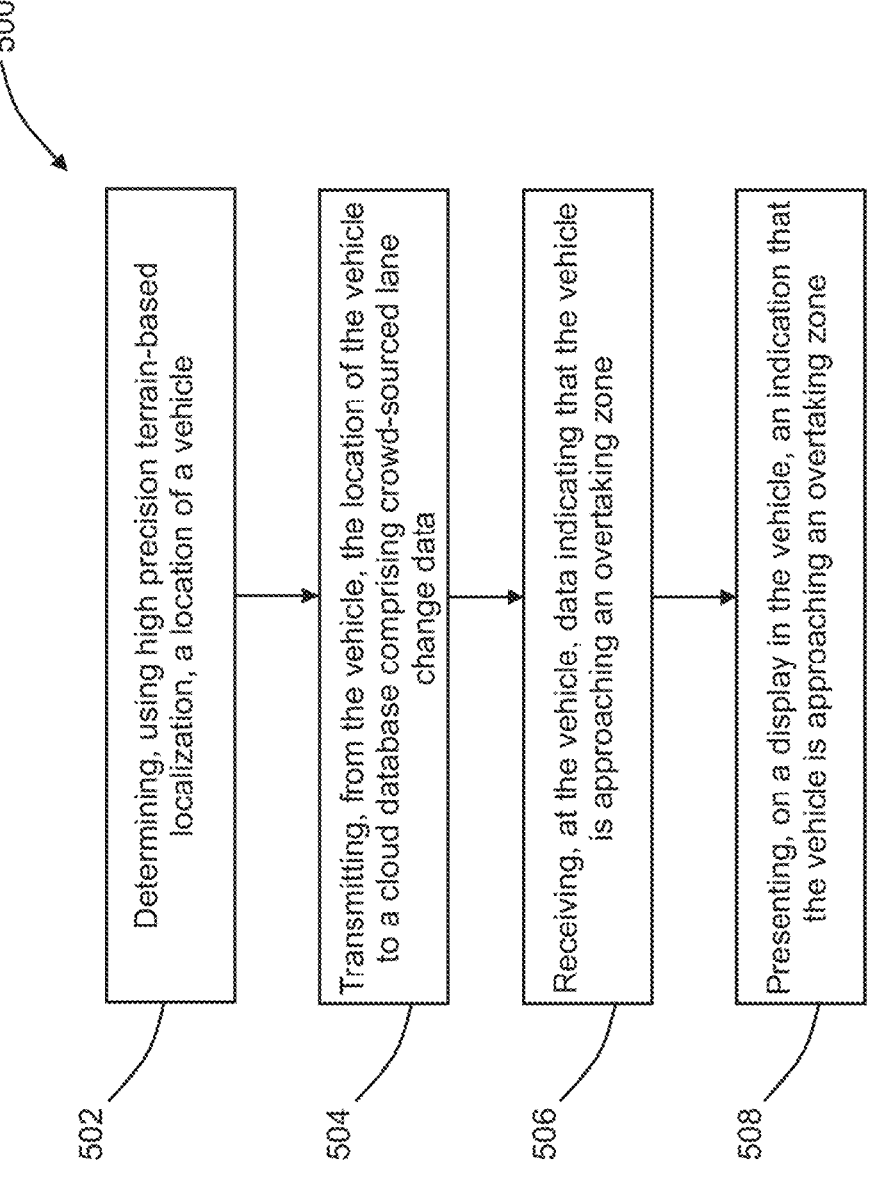
FIG. 6 is a flowchart showing a process of alerting a driver of a vehicle that the vehicle is approaching an overtaking zone.

Referring to FIG. 6, a method of performing lane change guidance for a vehicle is shown in a flowchart 500. The method includes using (502) terrain-based localization to determine the location of the vehicle. In some instances, high precision terrain-based localization provides location accuracy to within less than 12 inches. In some instances, high precision terrain-based localization provides location accuracy to within less than 8 inches. The method also includes transmitting (504), from the vehicle, the location of the vehicle to a cloud database comprising crowd-sourced lane change data. The method also includes receiving (506), at the vehicle, data indicating that the vehicle is approaching an overtaking zone. In some embodiments, this data may be based on crowd-sourced data from other vehicles similar to the vehicle (e.g., same body type, traveling at same time of day/day of week, traveling during same type of weather, traveling at same time of year, etc.). The method also includes presenting (508), on a display in the vehicle, an indication that the vehicle is approaching an overtaking zone. In some implementations, this presenting step may include presenting that the overtaking zone ends in a certain amount of distance (e.g., 0.1 miles, 0.2 miles, etc.) or a certain amount of driving time (e.g., 5 seconds, 10 seconds, 30 seconds, etc.). The driving time may be based on a current speed of the vehicle.

The lane change detection system may use statistical information to anticipate a lane change, which may be different than a steering event, while following the road. If the road profile for a particular road segment is known (i.e., by a terrain-based localization system), the vehicle may determine when a lane departure has occurred and then when the vehicle has re-entered the lane by comparing currently gathered road data with the previously collected road information.

In some implementations, lane change maneuvers that are detected by a vehicle are uploaded to a cloud database. These lane change maneuvers may be aggregated and be labeled as a lane change event on the road segment on which the lane change maneuver often occurs. In some instances, a vehicle's own statistical information and weight may be used in view of crowd sourced data, which may include past information regarding the vehicle and the vehicle's driving behavior. Crowd-sourced information may be separated into similar vehicle groups, based on vehicle attributes. For example, data from sporty sedans (which, for example, may perform overtaking maneuvers more often or at different locations than other types of vehicles) may be separated from data from pickup trucks or large SUVs. In some instances, only data sourced from vehicles similar to the driven vehicle in at least one aspect may be used in determining whether an overtaking zone exists. In some implementations, similar to the driven vehicle may mean the same vehicle body type (e.g., sedan, SUV, pickup truck), same engine/power type (e.g., large/powerful gas engine, small gas engine, hybrid engine, electric vehicle, etc.), same driving type (e.g., human driven, semi-autonomous, autonomous, etc.), etc.

In some implementations, meta data may be used to separate and/or categorize overtaking maneuvers. For example, data may be sorted by season (e.g., winter versus summer). In some instances, roads may be differing widths in the winter due to snow accumulation and some areas which may have been appropriate for overtaking maneuvers in non-snowy environments may be inappropriate with due to snowbank accumulation. In another example, time of day and/or day of week/year information may also be used. For example, overtaking maneuvers may be performed at different frequencies or at different locations at night or on weekend days. Differing traffic patterns, which may depend on the day and time of travel (e.g., weekday, holiday, summer weekend day, ski season, etc.), may influence patterns of overtaking maneuvers that may occur. In some instances, a correction factor may be applied to overtaking maneuver data based on meta data associated with the particular instance of overtaking. This correction factor may allow filtering within the database of overtaking maneuvers that occur under similar conditions to the present vehicle and/or condition.

In some instances, an indication that an overtaking zone exists may be based primarily, or solely, on overtaking maneuvers that occur under similar weather conditions to the present vehicle. Similar weather conditions may mean similar temperature ranges (e.g., above freezing, below freezing, approximately 32 degrees F., above 80 degrees F., etc.), similar precipitation conditions (e.g., heavy rain, light rain, heavy snow, light snow, freezing rain, no precipitation, etc.), similar visibility conditions (e.g., low visibility due to fog, high visibility, etc.), etc.

In some instances, an indication that an overtaking zone exists may be based primarily, or solely, on overtaking maneuvers that occur under similar time conditions to the present vehicle. Similar time conditions may mean the same day of the week, same type of day of the week (e.g., weekends day versus weekdays), same type of day of year (e.g., holidays versus non-holidays), same date, same season (e.g., spring, summer, fall, winter), same portion of day (e.g., same hour of the day, morning commute time, evening commute time, morning, afternoon, evening, night, etc.).

In some instances, an indication that an overtaking zone exists may be based primarily, or solely, on overtaking maneuvers that are performed by drivers of a similar skill level to the driven vehicle. Similar skill level may mean length of driving record (e.g., number of years driving), reported skill level by the driver (e.g., beginner, intermediate, advanced), skill level determined based on driver behavior (e.g., sensing driver behavior and determining a beginner, intermediate, or advanced skill level, etc.), etc.

Conservation of Telemetry Bandwidth by Comparison to Existing Road Data

A naïve telematics system may upload all high-resolution data during a drive. The inventors have recognized that by selectively uploading only road profile information that includes data that is different from historical data allows the system to conserve bandwidth. Conserving bandwidth may be important as systems, which may be simultaneously uploading and downloading high-resolution road profile data, including terrain-based localization or proactive suspension control, may become bandwidth limited.

High-resolution road profile data may be needed by various in-vehicle control systems. However, substantial cellular bandwidth may be required to constantly update a road profile database, especially under conditions of high vehicular traffic. If a vehicle has downloaded a stored road profile and has determined that current data (i.e., vehicle data including road profile data for a current traversal of a road segment by the vehicle) matches expected data (i.e., vehicle data including road profile data for a previous traversal of a road segment by a vehicle (which may be a different vehicle or the same vehicle), the road profile data being stored in a cloud database) the vehicle may not need to upload the recorded current data. Instead, it may suffice, for example, to upload certain metadata about whether the road profile has matched and/or how well the road profile has matched.

Figure 7:
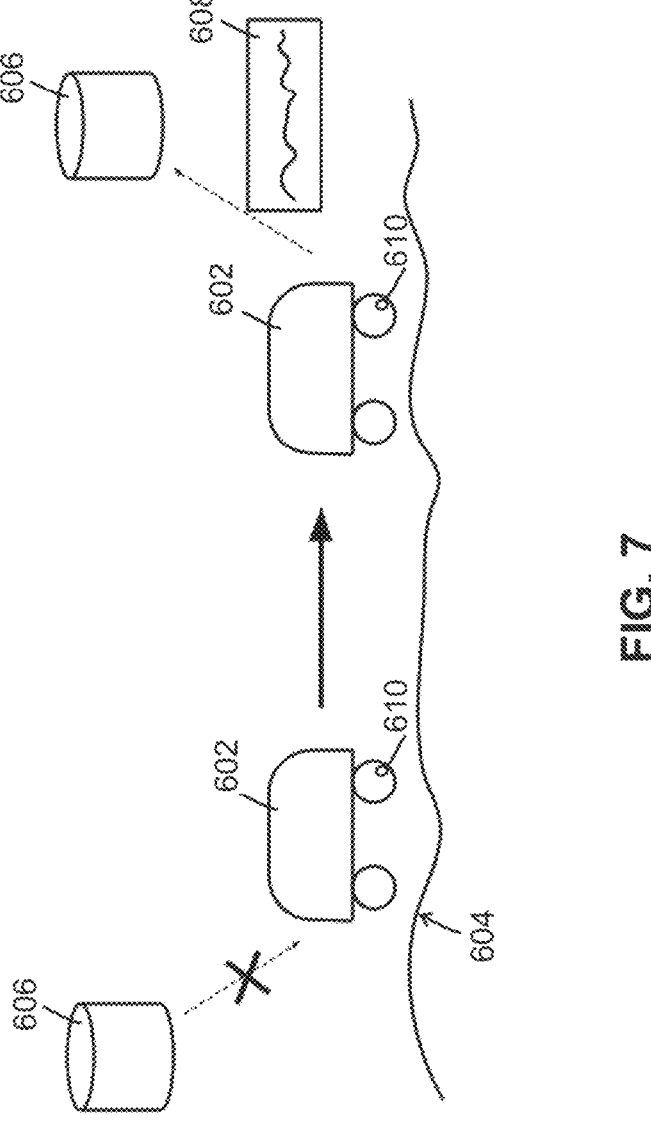
FIG. 7 shows a vehicle uploading a new recorded road profile to a database.

As illustrated in FIG. 7, as a vehicle 602 travels on a road 604, a sensor 610 (e.g., a wheel sensor, an accelerometer, etc.) of the vehicle 602 may collect data related to the road, such as for example, road surface data. The data may be used to determine a road profile 608 of the road 604, or otherwise characterize the environment of the road, on which the vehicle 602 is traveling. The road profile 608 may be determined by a processor on board the vehicle 602. The vehicle 602 may send a request, to the cloud database 606, for data about the road on which the vehicle 602 is traveling. This data may include stored and/or previously processed road profile information. When the road profile 608 obtained by the vehicle 602 is new (i.e., a cloud database 606 in communication with the vehicle 602 has no corresponding road profile stored), the vehicle 602, by a wireless transmitter, may upload the road profile 608 to the database.

The road profile 608 may include data derived from wheel accelerations (e.g., vertical motion data). In some implementations, data in the road profile 608 may be normalized. This normalization may be advantageous as vehicle specifics (e.g., make, model, tires, other options, etc.) of the vehicle 602 that collected the road profile 608, which may have affected the data making up the road profile 608, are irrelevant to the later consumption of the normalized road profile by one or more other vehicles. Additional data may also be uploaded along with the road profile data. This additional data may include, for example, event detection data, suspension position data, longitudinal acceleration data, and/or other telemetry, etc. Event detection data may be data that indicates that a particular road event (e.g., a pothole, speed bump, manhole cover, etc.) exists on a road segment at a particular location.

Figure 8:
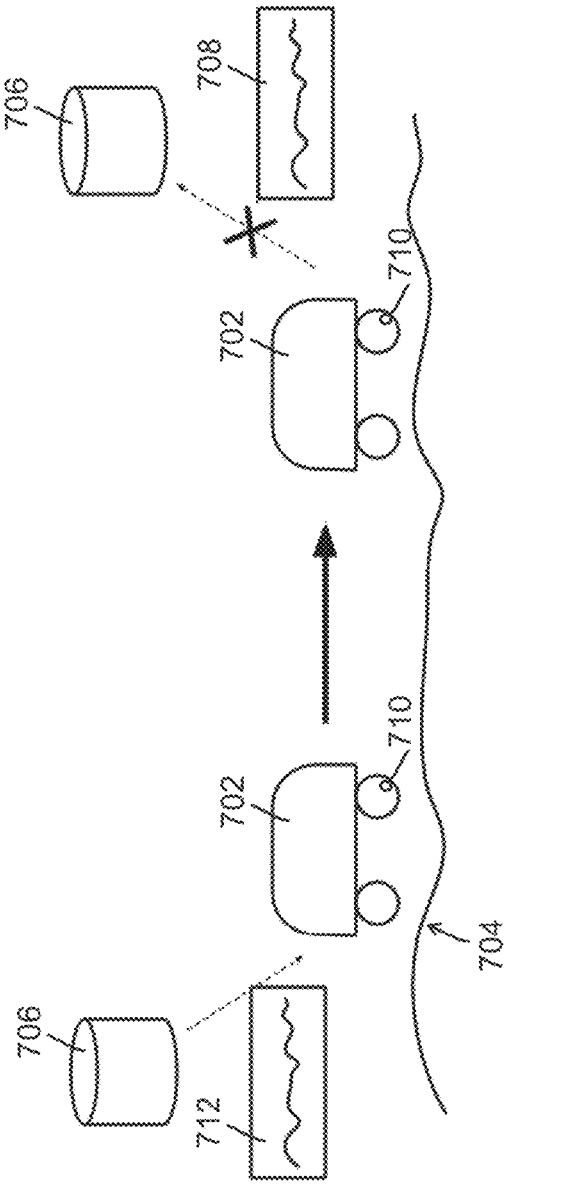
FIG. 8 shows a vehicle not uploading a recorded road profile to a database because the recorded road profile matches an existing road profile in the database.

As illustrated in FIG. 8, as a vehicle 702 travels on a road 704, a sensor 710 (e.g., a wheel sensor, an accelerometer, etc.) of the vehicle 702 collects data related to the road surface. The data may be used to determine a profile of the road 704 on which the vehicle 702 is traveling. The road profile 708 may be determined by a processor on board the vehicle 702. As the vehicle 702 is traveling along the road, a cloud database 706 may inform the vehicle (by sending data to a wireless receiver of the vehicle 702) of a stored road profile 712 for an upcoming segment of road that is stored in the cloud database 706. The processor on board the vehicle 702 may determine if the current road profile 708 (i.e., the road profile obtained by the vehicle 702 during the current trip) and the previously stored road profile 712 from the cloud database 706 match sufficiently. To determine that the profiles match to a sufficient degree, the system may perform, for example, a cross-correlation between the current road profile 708 and the stored road profile 712. If the current road profile 708 and the stored road profile 712 have a similarity factor above a threshold, for example 0.75, the current road profile 708 and the stored road profile 712 are determined to be sufficiently matching.

If the on-board processor determines that the current road profile 708 and the stored road profile 712 do match, the vehicle 702 may conserve bandwidth by not uploading recorded data corresponding to the current road profile 708 to the cloud database 706. In some implementations, which will be discussed later, only portions of the recorded data corresponding to the current road profile (e.g., current road profile 708) may be uploaded to the could database 706.

In some implementations, data may be selectively downloaded from the cloud database 706 and saved to the vehicle 702. For example, when the vehicle 702 is connected to a Wi-Fi network, data for one or more planned paths may be downloaded to conserve bandwidth needed over a cellular network. For example, road profile data for a path between a current location of the vehicle 702 and the driver of the vehicle 702's home, work, or other commonly frequented location may be downloaded.

Figure 9:
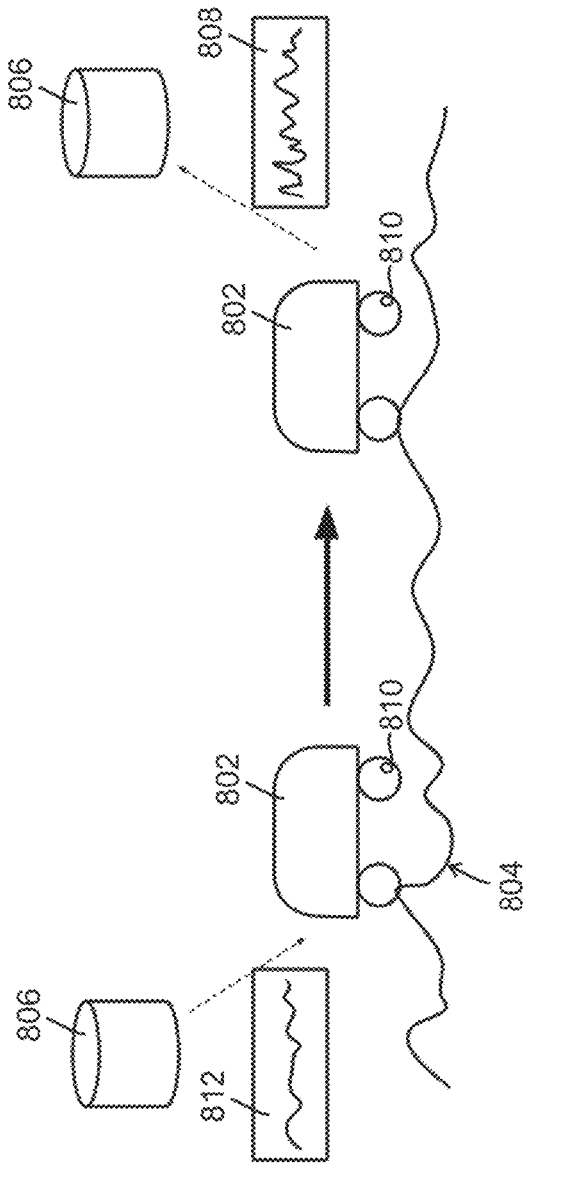
FIG. 9 show a vehicle uploading a recorded road profile to a database because the recorded road profile does not match an existing road profile in the database.

As illustrated in FIG. 9, as a vehicle 802 travels on a road 804, a sensor 810 (e.g., a wheel sensor, an accelerometer, etc.) of the vehicle 802 may collect data related to the road surface. The data may be used to determine a current road profile 808 of the road 804 on which the vehicle 802 is traveling. The current road profile 808 may be determined by a processor on board the vehicle 802. As the vehicle 802 is travelling along the road, a cloud database 806 may inform the vehicle 802 (by sending data to, for example, a wireless receiver of the vehicle 802) of an upcoming road profile 812 that is stored in the cloud database 806. The processor on board the vehicle 802 may determine if the current road profile 808 obtained by the vehicle 802 and the stored road profile 812 from the cloud database 806 match (as described previously). If the current road profile 808 does not match the stored road profile 812, the vehicle 802 may upload, via a wireless transmitter, the current road profile 808 to update the database 806. In some embodiments, the database 806 may replace (or update) the stored road profile 812 with (or by using) the current road profile 808. In some embodiments, the database 806 may save the current road profile 808 as a new version of the stored road profile 812, such that the stored road profile 812 (now an old version) may be accessed if needed. For example, if multiple traversals of the road 804 are completed, it may be determined that the most current road profile 808 and stored road profile 812 are both valid options of road profiles that may be experienced along the road 804 (e.g., if the road 804 has multiple lanes). In such instances, overwriting each time a new profile is experienced may not be appropriate. For example, in some implementations, it may be possible that a newly obtained profile is for another, generally parallel, lane of the same road and that multiple, non-matching, road profiles may be experienced by a vehicle travelling along the same road. Upon uploading the newly obtained profile, a clustering process may allow sorting of different profiles into multiple lanes.

Embodiments described herein contemplate that selective uploading may be used on all types of roads. It is also contemplated that bandwidth may be conserved if no current road profile data, or a limited subset of road profile data, regardless of whether such current road profile data matches a corresponding stored road profile in a cloud database, is uploaded for smooth roads. In some implementations, smooth road profile data may be downloaded and used for consumption, but the current road profile may not be uploaded (or may be uploaded at a later time, e.g., when Wi-Fi is available). This may still provide acceptable performance because, for example, in some instances, a slight difference between a stored road profile and a current road profile, if both represent a generally smooth road, may not impact a corresponding command to the vehicle in a perceptible way to a vehicle occupant. In some implementations, the terrain-based localization system may inform another vehicle system (e.g., an ADAS, that the road ahead is smooth).

In some implementations, only those portions of the data that represent road events and/or deviations from smooth, may be uploaded. For example, if a vehicle is traveling on a very smooth road, but then hits a pothole, only the road data around the pothole may be transmitted. In such an example, transmitting hundreds of meters of smooth road data may be wasteful just to get data about the experienced pothole up to the cloud database.

Referring to FIG. 9, additional data at high resolution (e.g., for greater than 1 million vehicles per day) may have minimal value to a database after road segments have "matured". The system as described herein may (1) determine maturity threshold(s) to reduce data transfer from the vehicle while sustaining database quality and (2) determine what data from the vehicle is transferred to the cloud database. As data transfer through cellular networks is charged by the number of bytes used, reducing unnecessary data transfer may reduce the cost of the provided service to a vehicle. Once a database entry has matured, statistics may still be useful and may help determine if a road has changed or if there is a temporary change in conditions such as snow, ice, rain, etc.

Maturity may be determined on a short-term basis or on a long-term basis and maturity thresholds may be determined by statistical significance. For example, in some implementations, after data from 500 vehicles is received for a specific road segment on a specific day during a morning commuting period, the database entries for that road segment may be considered mature for that specific day or week. Data may be collected again at a normal rate after a time period, after which the database entries for that specific road segment may be relabeled as immature. In some implementations, a mature entry may be relabeled as immature if a change occurs to the road surface. In some instances, this change may be, for example, a filled pothole, a repaved road, a new speedbump, grooved pavement during construction on the road, etc.

Figure 10:
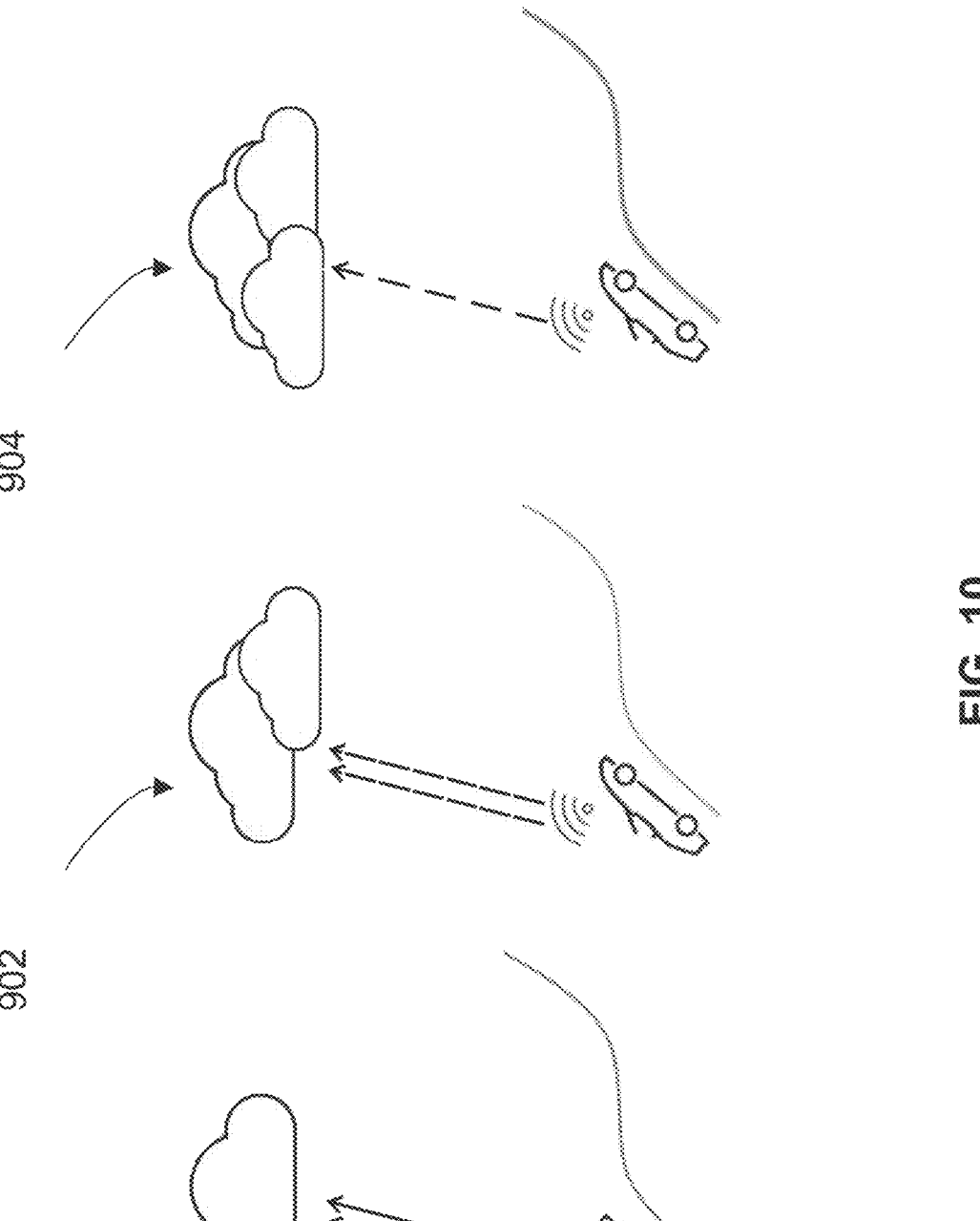
FIG. 10 shows a schematic of uploading road information based on a maturity level of the database.

Referring to FIG. 10, at state 900, a road profile entry (corresponding to a road segment of a road) in the cloud database is "immature" so all, a substantial percentage, or effectively all road data may be uploaded to the database to further refine the database and move toward maturity. In some implementations, this uploading may be done at a high data rate. In some implementations, an "immature" database entry may correspond with approximately 100 drives of the road segment where road data has been collected.

At state 902, a road profile entry (corresponding to a road segment of a road) in the database is "maturing" and additional road information may be uploaded, for example, to provide meaningful statistics to confirm database validity or user behavior. In some implementations, this additional road information may be uploaded at a medium data rate. In some implementations, a "maturing" database entry may correspond with approximately 1000 drives of the road segment where road data has been collected.

At state 904, a drive in the database is "mature" and additional drive-statistics may not add value, so the road data may, in some implementations, be disregarded. In other implementations, a subset of the road data may be uploaded. In some implementations, a subset of the road data may be uploaded at a low data rate. In some implementations, a "mature" database entry may correspond with approximately 5000 drives of the road segment where road data has been collected.

In some implementations, the maturity of a database entry may be determined in the cloud based on a degree of matching between current road profiles (e.g., current road profiles 608, 708, 808 shown previously) and stored profiles (e.g., stored road profiles 612, 712, 812 shown previously). If current road profiles are consistently and strongly matching stored road profiles, a database entry may be considered mature prior to a particular number of drives where data on the road segment is collected being reached.

In some implementations, the cloud database may inform the vehicle whether it wants data for particular road segments on which the vehicle is traveling or is predicted to travel. The cloud database may base this request on traffic information, time of day, day of week, etc. For example, during rush hour on a major highway, hundreds of vehicles may travel over a certain road segment within an hour. The cloud database may not need data from all of the vehicles traveling over this road segment. For example, in such a situation, the database may request data from every other car, every fifth car, every tenth car, etc.

In some implementations, road data may be stored on-board the vehicle for later transmission to the cloud database. For example, in a situation where the current road data does not match the cloud provided data, the vehicle may store the current road data for later transmission if sufficient bandwidth is not available when the data is collected. In some implementations, a flag that would inform the database that non-matching road data was collected may be sent.

Referring to FIG. 11, a method for updating a cloud database of road data is shown by flowchart 950. The method includes obtaining (952), from one or more sensors, acceleration data as a vehicle traverses a track on a road segment. In some implementations, the sensors may be wheel speed sensors, wheel accelerometers, body accelerometers, an IMU, etc. The method also includes converting (954) the acceleration data into a current road profile of the track on the road segment. The method also (956) includes obtaining, from a cloud database, a stored road profile corresponding to the road segment. The method also includes cross-correlating (958) the current road profile with the stored road profile. The method also includes determining (960) that the current road profile and stored road profile do not match and uploading the current road profile to the cloud database.

Correction of Reported Automobile Speed by Analysis of GPS Coordinates

Vehicles often report their speed based on the rotation rate of all four wheels. However, true vehicle speed will vary depending on, for example, wheel radius and tire pressure, wheel rotation sensor accuracy, which may cause problems when highly accurate dead reckoning is required. The inventors have recognized that different vehicles report slightly different speed values over CAN (e.g., there may be an approximately 2% difference between vehicles), which may be a problem for high precision terrain-based localization (i.e., localization where accuracy of location is within 1 meter or less, or on the order of centimeters, etc.). Speed measurements more accurate than is typically possible in conventional vehicles may be necessary, for example, for dead reckoning and converting signals from the time domain to distance domain. The system described herein finds a scaling factor to correct reported speed by analyzing GPS and steering data over a long period of time.

GPS serves as a potential source of ground truth because GPS reports the same position when any vehicle is in a given location. By calculating the distance covered by GPS samples over time, it is possible to synthesize a scaling factor to correct CAN speed. However, GPS is not very precise. Coordinates reported by a consumer-grade GPS receiver may drift 10 meters or farther from the actual coordinates of the receiver location. To create a speed scaling factor, a moderate amount of GPS and speed data for each vehicle is collected. When collecting GPS data, sample precision is important. The system described herein selects the more precise GPS samples for scaling factor synthesis. The system may determine that the GPS samples obtained when at least a threshold number of satellites are visible are more precise than other GPS samples. After the most precise GPS samples have been selected, a speed correction may be calculated, as also described below.

GPS Sample Selection

Figure 12:
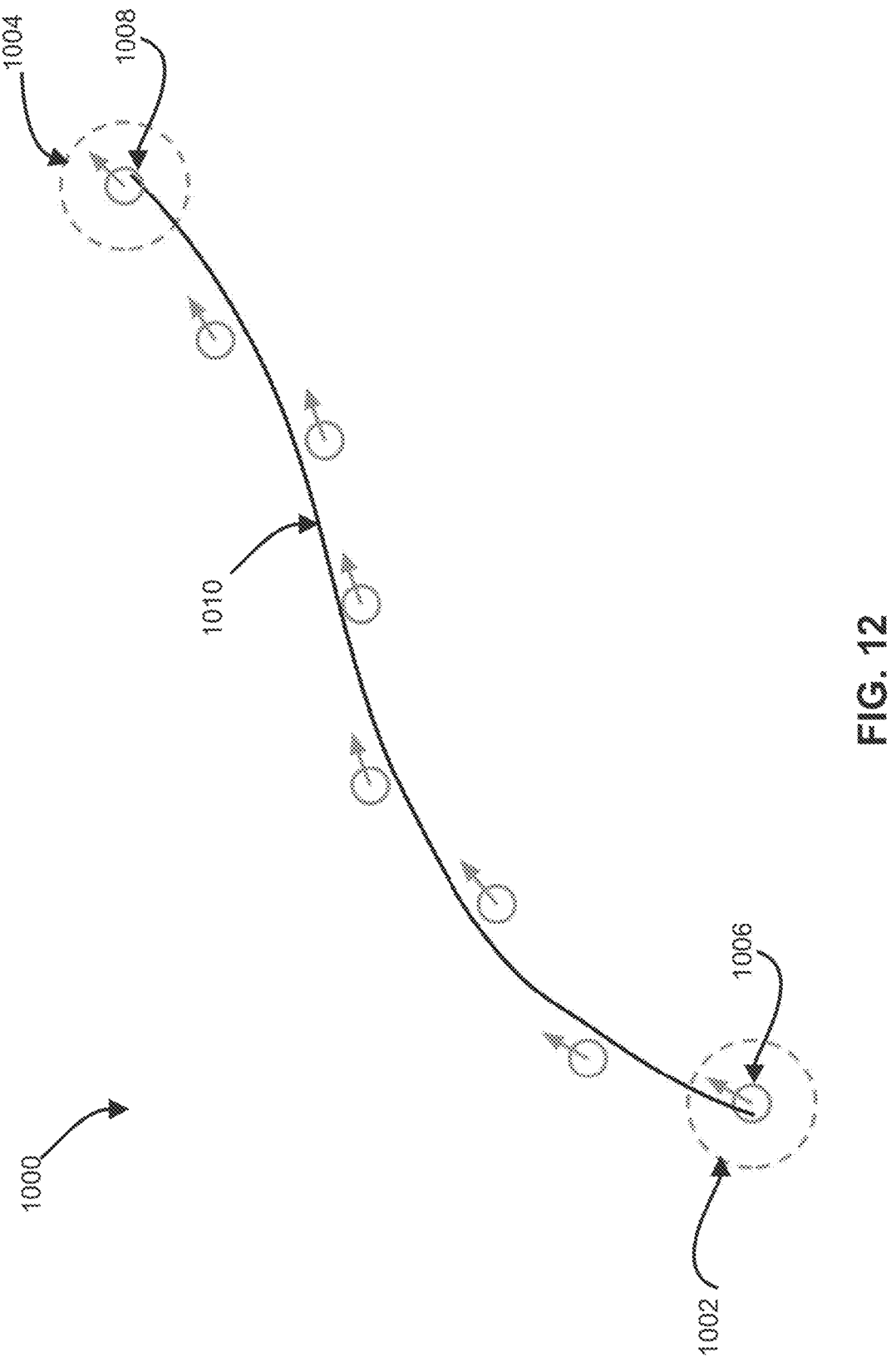
FIG. 12 is a diagram of a vehicle traveling along a road with GPS sampling where an error associated with each end point is ±5 meters.
Figure 13:
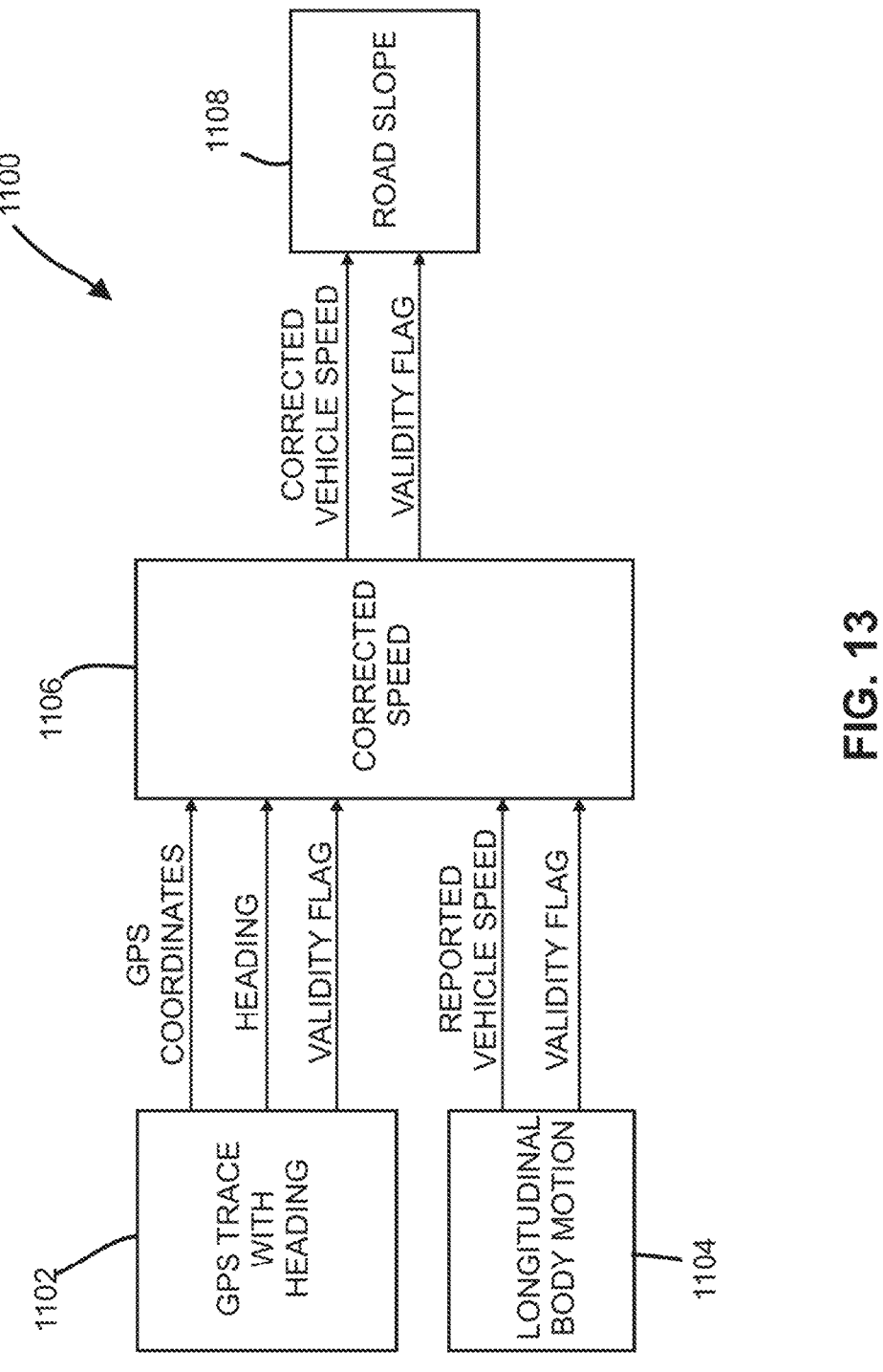
FIG. 13 is a block diagram of a speed correction system configured to determine road slope for terrain-based localization.

Precise sample selection may be used for performing speed scaling factor corrections. To select precise samples, the system determines when the vehicle is driving straight and at a constant speed. These vehicle driving conditions (straight and constant speed) are preferred as the GPS coordinates reported under these vehicle driving conditions are less likely to include a moving average determination (which introduces error), which is a built-in function for many GPS modules. Turning to FIG. 13, the speed correction block 1106 of speed correction system 1100 takes as inputs GPS coordinates, a heading, and a validity flag from a GPS trace block 1102. The validity flag indicates whether the GPS is receiving enough satellite information (e.g., the GPS has enough satellites reporting data) In some implementations, the GPS trace block 1102 reads GPS coordinates and a heading of a vehicle at a sampling rate of at least 1 Hz (e.g., between approximately 1 and 10 Hz). An example of a GPS trace (with lateral deviation reduced) is shown by element 1010 in FIG. 12. Accuracy of the GPS coordinates determines the amount of distance which may be traversed to calibrate corrected speed in block 1106. In some implementations, accuracy of the heading may be ±1 degree. In some implementations, when consecutive heading samples differ by less than approximately 2 degrees, the vehicle is considered to be traveling straight. Other differences between consecutive heading samples are permissible and the disclosure is not so limited. However, the higher the variation between consecutive heading samples that is allowed, the more error that is inherent in the speed scaling factor calculation, which is shown below.

The speed correction block 1106 also takes as inputs a reported vehicle speed and a validity flag from a longitudinal body motion block 1104. In some implementations, the reported vehicle speed ($v_{reported}$) may have a sampling rate of at least 20 Hz. Other sampling rates less than 20 Hz may be permissible and the disclosure is not so limited. However, higher sampling rates improve accuracy in determining dead reckoning distance. In some implementations, the validity flag checks whether the reported vehicle speed is within ±10% of the true speed, however other values are possible and the disclosure is not so limited. This is a form of "way off" check, which is used to double check validation of the distance traversed against GPS coordinates. This check may capture anomalies which may cause GPS jumping, which could significantly impact a speed correction calculation.

In some implementations (not shown in FIG. 13), the speed correction block 1106 may also take as an input a flag indicating whether the vehicle speed signal is valid. Based on the inputs from the GPS trace block 1102 and the longitudinal body motion block 1104, the speed correction block 1106 calculates a corrected vehicle speed ($v_{true}$).

Speed Correction Determination

The speed correction block 1106 may output the corrected vehicle speed ($v_{true}$) and a validity flag, the validity flag indicating whether the corrected speed is valid. In some implementations, the sampling rate of the corrected vehicle speed is at least 20 Hz and the accuracy of the corrected vehicle speed is ±0.3%. Depending on requirements of a road slope calculation block 1108, the sampling rate and/or accuracy may change. The road slope (i.e., given a change in longitudinal distance, how much the road rises or falls vertically) calculated by road slope calculation block 1108 is used for terrain-based localization. By using corrected speed ($v_{true}$) rather than reported speed ($v_{reported}$), dead reckoning accuracy may be significantly improved.

True vehicle speed relates to reported vehicle speed by the following equation, where C is some unknown constant:

$$v_{true} = v_{reported} * C$$

A goal of this speed correction determination method is to determine the value of C which corrects the reported speed. As shown in FIG. 12, GPS is relatively inaccurate for determining an absolute location at a single position (see ±5 meter error represented by dotted circles 1002 and 1004 that is associated with GPS samples associated with steering 1006 and 1008, respectively). However, GPS does not suffer from drift over long distances (e.g., 100 meters). A speed reporting error based on tire radius or wheel rotation sensor accuracy may be approximately 2%. Using the relationship between these errors (±5 meters becomes small in view of the 2% speed reporting error over long distances) GPS may be leveraged to find a speed scale correction.

A distance between consecutive GPS coordinates may be compared with distance computed by integrating true speed:

$$d_{GPS} \approx \int v_{true}(t) \, dt$$

$$d_{GPS} \approx \int v_{reported}(t) \, C \, dt$$

For small distances, $d_{GPS}$ will have a large error in comparison to integrated speed. However, for sufficiently large distances, $d_{GPS}$ will approach a very accurate value. In an example, if desired speed accuracy is, for example, ±0.3% and GPS is, for example, accurate within ±5 meters, the distance to obtain the target speed accuracy may be determined as follows:

$$d_{GPS}*1.003 > d_{GPS} + 5*2$$

$$d_{GPS}*0.003 > 10$$

$$d_{GPS} > 3333$$

In this example, to achieve the target accuracy, the speed correction may rely on at least 3333 meters of speed and GPS data. Until this criterion has been satisfied, corrected speed may be marked as invalid. The factor of 2 on the right side of the equation comes from the start and ending coordinates each having a possible error of +/−5 meters.

Figure 14:
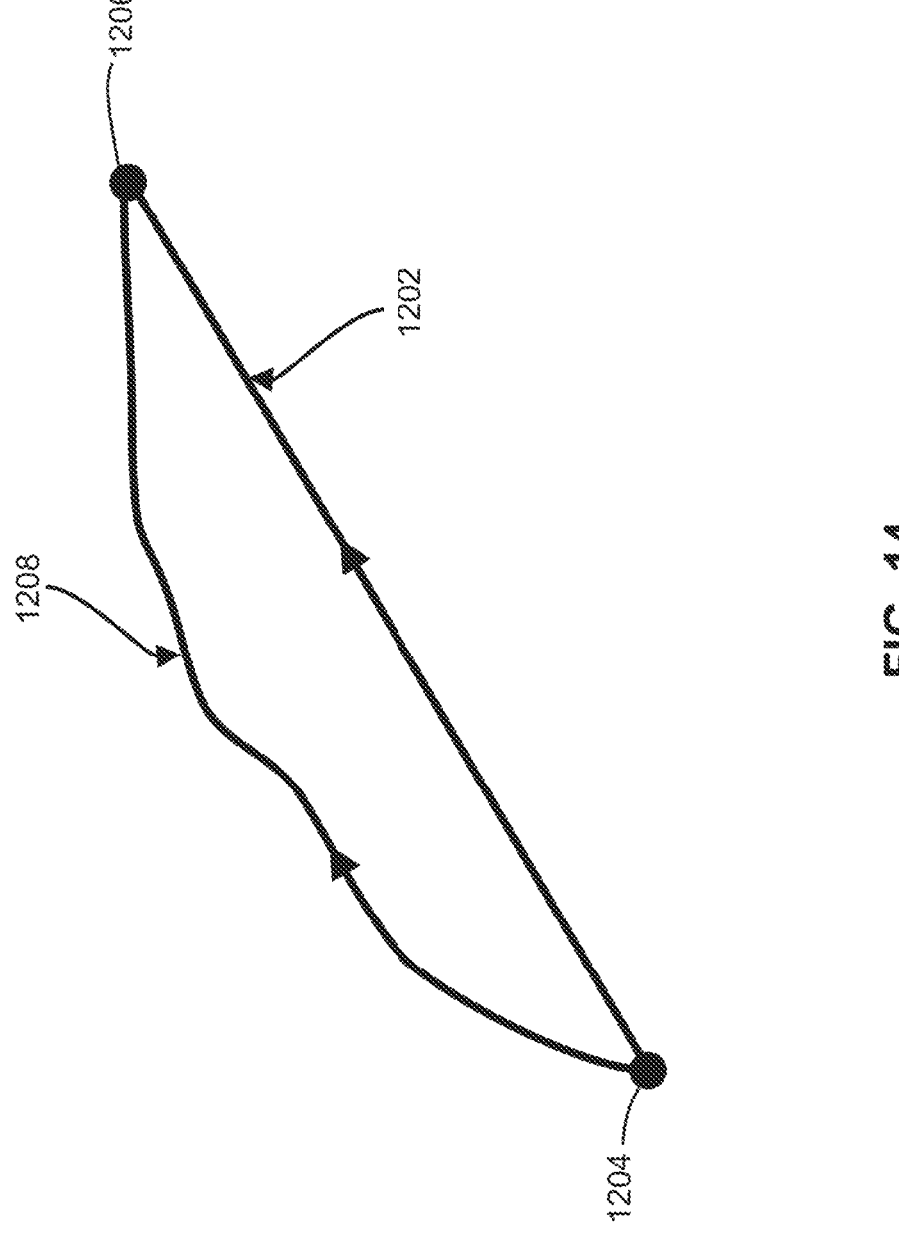
FIG. 14 is a diagram of an actual vehicle path compared to a straight-line path between two GPS coordinates.

Referring to FIG. 14, if vehicle yaw rate is non-zero (meaning that the vehicle is turning), the straight-line path 1202 between two GPS coordinates, starting coordinate 1204 and ending coordinate 1206, may be different than distance determined by dead reckoning, which would match a distance traveled by the vehicle on the actual path 1208 taken between starting coordinate 1204 and ending coordinate 1206. For example, if the vehicle is traveling with constant (true) speed v with constant yaw rate ω for duration t, error $d_{error}$ caused by this yaw rate may be calculated in the following manner:

$$d_{error} = d_{curve} - d_{straight}$$

$$d_{curve} = v * t$$

-continued $$\theta = \omega * t$$

$$c = v\frac{2\pi}{\omega}$$

$$r = \frac{c}{2\pi} = \frac{v}{\omega}$$

$$d_{straight} = 2r\sin\frac{\theta}{2} = 2\frac{v}{\omega}\sin\frac{\omega t}{2}$$

$$d_{error} = vt - 2\frac{v}{\omega}\sin\frac{\omega t}{2}$$

In this equation $d_{straight}$ includes a worst case scenario that consecutive headings vary by a maximum 2% (e.g., always steering by 2% from the previous heading). These equations assume a constant $\omega$. Variations in $\omega$ may increase error in the dead reckoning scaling factor computed.

As an example, suppose that yaw rate $\omega$ is 4 degrees per second (about 0.07 radians per second), v is 15 m/s, and t is 1 second:

$$d_{error} = 15 * 1 - 2\frac{15}{0.07}\sin\left(\frac{0.07 * 1}{2}\right)$$

$$d_{error} = 15 - 14.9969 = 0.0031$$

The distance error is 3.1 millimeters. If the vehicle travels 15 meters during this time, the percent error is 0.021%.

In some implementations, speed corrections may be performed when a vehicle is traveling on a relatively "level plane", i.e., at constant altitude. Altitude changes may complicate the speed correction. In some implementations, an accelerometer, altimeter, or other appropriate sensor may determine altitude change, which may be used as an input to a speed correction calculation as shown above.

Tire parameters (e.g., tire pressure, tire type, etc.), for example, may have an impact on the speed correction calculation. Therefore, it may be important for the speed correction system to understand when tire parameters may have changed so that the speed correction may be updated. In some implementations, to account for changing tire parameters, speed corrections may be constantly updated. This constant updating to the speed correction may be completed without server-side communication. In other implementations, the vehicle may report, to the speed correction system, that one or more vehicle tires have been changed. In such an implementation, a recalibration may be completed to update the speed correction. In other implementations, the speed correction system may detect a tire change and enter a calibration state to update the speed correction.

Performance Supervisor for Terrain-Based Vehicle Control

Using knowledge of the upcoming road as well as precise localization (i.e., localization that may determine a location with accuracy to less than 1 meter, on the order of centimeters, etc.), the system described herein may be used to command active and/or passive forces (e.g., by an active suspension system) in order to provide improved ride characteristics over a feedback-only or reactive control loop. However, this command can result in degraded ride characteristics if (1) information about the upcoming road is incorrect and/or (2) the model used to determine the desired command is incorrect. Systems and methods described herein may detect such situations and may inform a controller to change one or more output commands. Systems and methods described herein may continuously or intermittently analyze a recent record, for example the previous few seconds, of vehicle motion, road motion, and/or force commands to determine if one or more of the commands by the controller during this period have helped or hurt the performance of the vehicle based on a predetermined criterion or criteria based on sensor measurements or occupant feedback. If the system finds that the system is hurting performance, output commands may be scaled down to prevent continued underperformance.

In some implementations, scaling down output commands may include changing one or more gains in the controller. For example, the system may apply a 10% gain, a 50% gain, etc. to one or more of the controller's commands to reduce the output of the system. In some instances, scaling down the output commands may be frequency dependent. For example, gains may be applied only to output commands in particular frequency ranges, or may be applied differently across different frequency ranges. For example, in a first frequency range a 10% gain may be applied, in a second frequency range a 50% gain may be applied, and in a third frequency range no gain may be applied. This distribution allows the system to maintain performance in frequency ranges that are not experiencing degraded performance issues.

Figure 15:
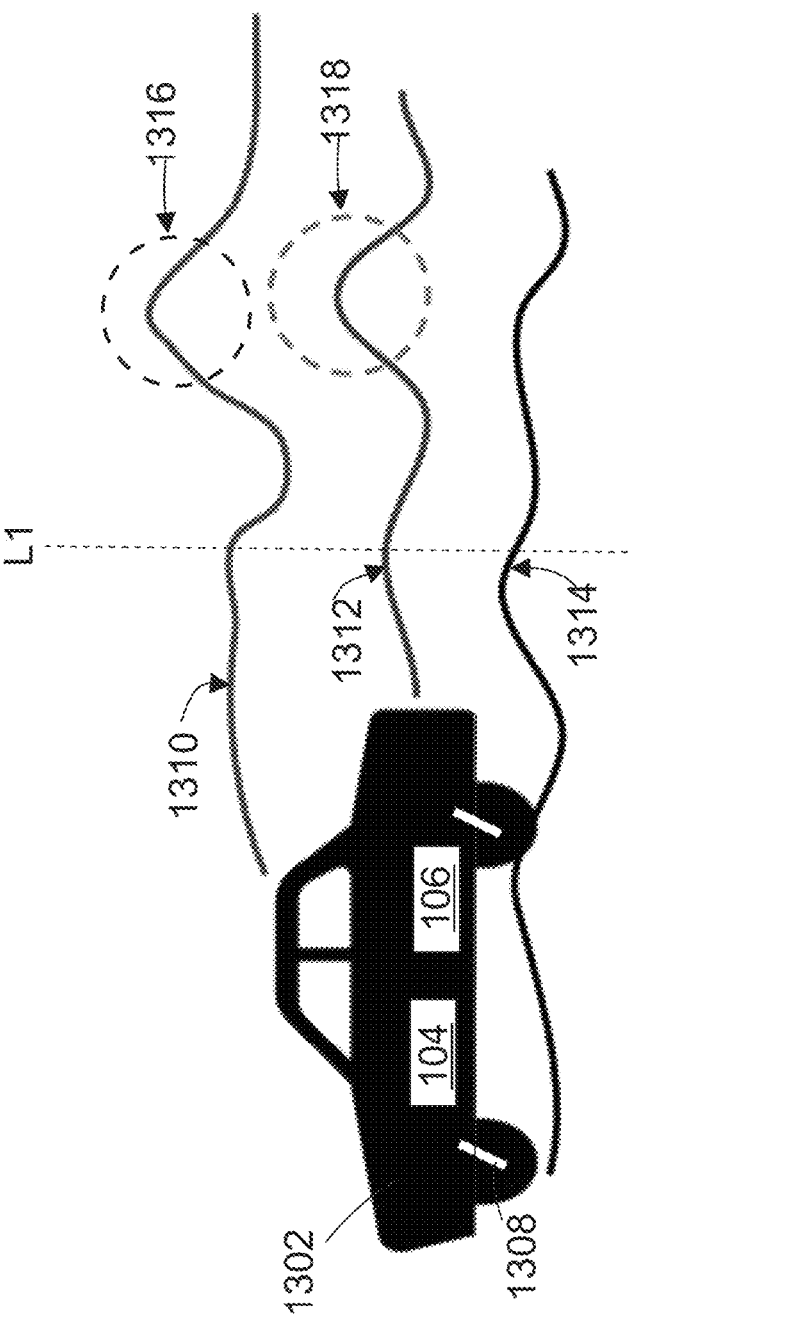
FIG. 15 is a schematic of a force command generated based on terrain-based localization that dampens vehicle body motion caused while traversing a road surface.

Referring to FIG. 15, a vehicle 1302 may be instrumented with one or more sensors. The one or more sensors may include one or more sensors 1304 that may support estimations of ride characteristics (e.g., body accelerometers, ride height sensors) and one or more sensors 1306 that may support terrain-based localization (e.g., wheel accelerometers, ride height sensors). The vehicle 1302 includes active or semi-active suspension actuators (e.g., actuator 1308) to which force/damping commands can be sent.

Using knowledge about the upcoming road, a command may be calculated and sent to the actuators (including actuator 1308) to improve the ride performance of the vehicle 1302. As the vehicle 1302 travels across a road surface 1314, the vehicle's wheels move based on features of the road surface (e.g., road smoothness, road profile, road events, etc.). A force command 1312 is output to suspension actuators (e.g., actuator 1308). If this force command 1312 is calculated based on a correct model and with accurate knowledge of the road surface 1314, the ride of the vehicle 1302 will be improved versus an uncontrolled vehicle's ride. In some implementations, where a road isolation strategy is preferred, body motion 1310 of the vehicle may be reduced. In some implementations, where a road following strategy is preferred, body motion 1310 of the vehicle may be increased. In FIG. 15, to the left of line L1, the body motion curve 1310 is relatively flat, showing a correct model and accurate knowledge of road surface 1314 which produces an appropriate force command 1312. However, if either, or both, of the model or road knowledge are inaccurate, the ride may be degraded (i.e., worse performance than a corresponding passive vehicle) rather than improved (i.e., better performance than a corresponding passive vehicle) as shown in FIG. 15 on the right side of line L1. For example, errors in the model or knowledge of road surface 1314 may cause an inappropriate force command, shown as by peak 1318, to be produced. The inappropriate force command may increase body motion (as compared to expected body motion of a corresponding passive vehicle), shown as peak 1316. A performance supervisor of the system, as shown in FIG. 16, may determine that the body motion output is larger than a prediction, meaning that performance of the system has degraded, and flag an error in the system.

Figure 16:
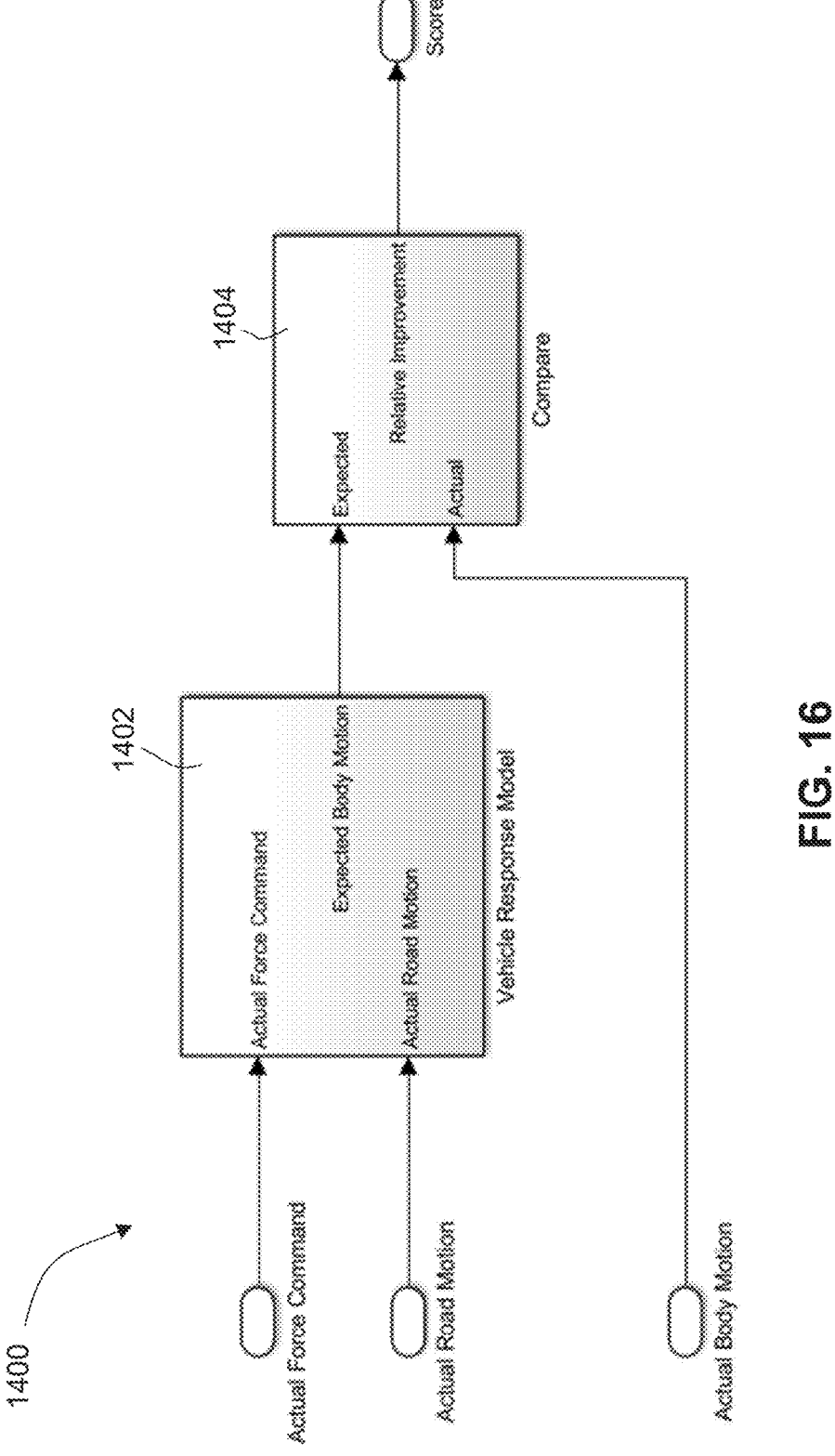
FIG. 16 is a block diagram of a model supervisor for a terrain-based localization system.

Referring to FIG. 16, a performance supervisor 1400 is configured to detect degraded performance of one or more vehicle actuators. The performance supervisor 1400 includes a vehicle response model 1402. The vehicle response model 1402 takes as inputs the road information (e.g., road profile, road slope, road event information, etc.) and actuator commands. High precision localization (i.e., localization that may determine a location with accuracy to less than 1 meter, on the order of centimeters, etc.), is used to determine the actuator commands in real time, which are then input to the vehicle response model. The vehicle response model 1402 outputs an estimate of the resulting ride characteristics (e.g., body acceleration) of the vehicle (see, e.g., line 1310 in FIG. 15 representing vehicle 1302's body motion). The vehicle response model 1402 may be a simple linear quarter-car model, a half-car model, a more complex full-car model, or another appropriate vehicle model and the disclosure is not so limited. The vehicle response model 1402 may be able to run in real-time on the vehicle.

The vehicle response model 1402 may estimate the road motion using a combination of wheel accelerometers, body accelerometers, and ride height sensors to back-calculate the true road profile in real-time. For instance, a simple estimation model may estimate the vertical wheel motion and assume that the road is the same shape (i.e., assuming that the wheel follows the road sufficiently closely). In some implementations, an estimation model may estimate tire deflection in order to more accurately estimate the road surface.

Then, the vehicle response model 1402 may compare the estimated ride characteristics to the expected ride characteristics. In the example of FIG. 16, ride characteristics are simply vertical body accelerations ("body motion"). The expected and actual body accelerations may be filtered to a certain frequency range (e.g., 1 to 8 Hz) and then a relative improvement score may be calculated for a time period such as the most recent N seconds (e.g., 5 seconds) of data. In some instances, the relative improvement score may include a rolling root mean square (RMS) that is calculated for the last N seconds of data (e.g., 5 seconds). In some instances, the relative improvement score may include a standard deviation that is calculated for the last N seconds of data (e.g., 5 seconds). In some instances, an FFT of the signals may be compared to determine the relative improvement score. If the actual vehicle body acceleration's relative improvement score is significantly different (e.g., the actual vehicle body acceleration RMS is significantly larger than the expected body acceleration's RMS), this may indicate the actuator command is incorrect. In some instances, significantly different may mean between 2% and 100% different, between 5% and 100% different, between 10% and 100% different, between 15% and 100% different, between 20% and 100% different, etc. In some instances, the threshold for significance may be set based on what an occupant of the vehicle may be able to perceive based on driving conditions. Based on the magnitude of the relative improvement score, the actuator command may be scaled down or shut off completely (e.g., set at zero) to prevent continued issues of poor performance as discussed above.

In some implementations, ride characteristics may include suspension deflection. Reducing body accelerations means isolation is working correctly (usually at 0.8+Hz) while reducing suspension deflection means road following/tracking is working correctly (usually below 1 Hz).

In some implementations, the performance supervisor 1400 may communicate a relative improvement score to a cloud database. In some instances, the relative improvements scores stored in the cloud database may be used for vehicle diagnostics. In some implementations, relative improvement scores sent to the cloud database may be used to determine particular models or types of vehicles where performance may be improved. For example, consistently lower relative improvement scores for one model of vehicle may indicate that the actuator commands are mismatched to vehicle performance for that model, or that that model's sensors are faulty, etc.

Real-Time Road Estimator Calibration

When a vehicle drives over a road, a terrain-based localization system may use collected sensor data to create an estimate of the road profile. However, there will always be some error between this road estimate and the true road. This error may be caused by sensor calibration issues, unmodeled vehicle dynamics, etc. A better road estimate can be synthesized from multiple vehicles' drives over the same road to create a composite road profile. In some implementations, the composited road profile is created by intelligently averaging the different road profiles obtained. With this better road estimate, parameters of each vehicle's road estimation algorithm may be tuned such that if the vehicle re-acquires data on the same road, that vehicle's new estimate would more closely match the composite road profile. The inventors have recognized that tuning vehicle road estimators in real time solves a problem of scaling estimator calibration to many vehicles (e.g., tens, hundreds, thousands, etc.) by averaging away individual errors.

Figure 17:
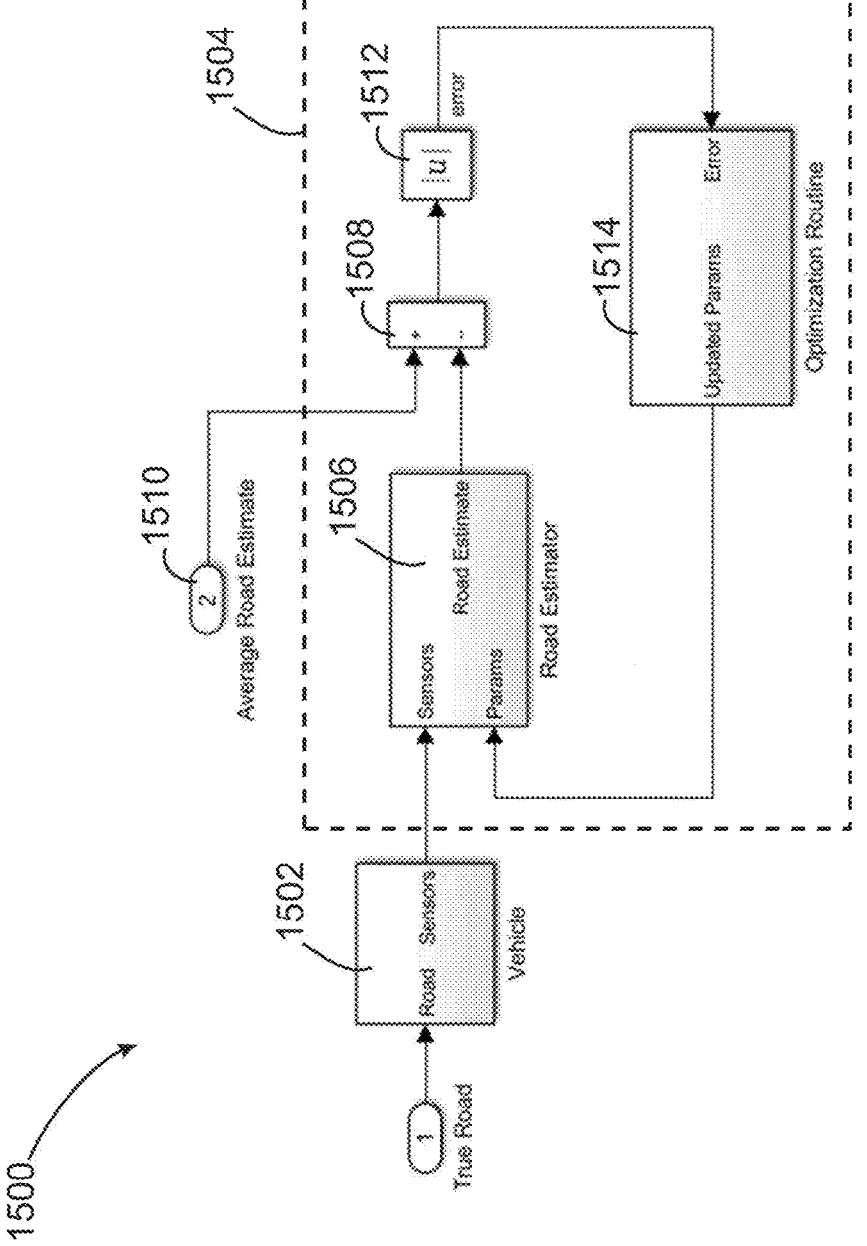
FIG. 17 is a block diagram of a system for optimization of a real-time road estimator.

Referring to FIG. 17, a vehicular terrain-based localization system 1500 includes a vehicle 1502 that is equipped with sensors (e.g., wheel sensors, body sensors, accelerometers, etc.). A controller 1504 on the vehicle 1502 is configured to execute a road estimation algorithm 1506, which converts raw sensor signals into a road estimate.

In some implementations, the conversion is accomplished by estimating a motion of the wheel (e.g., using wheel accelerometers), estimating a tire compression using a physical quarter-car model, and subtracting the tire compression from the wheel motion to determine the road estimate. In some other implementations, the conversion is accomplished by estimating a motion of the wheel (e.g., using wheel accelerometers) and then applying a notch filter around wheel hop frequency (e.g., approximately 12 Hz, approximately 10-15 Hz, etc.) to remove the wheel hop from the signal. Due to calibration and placement of the wheel accelerometers, or other sensors, the road estimate may be inaccurate, but is useful within the terrain-based localization system 1500.

Figure 18:
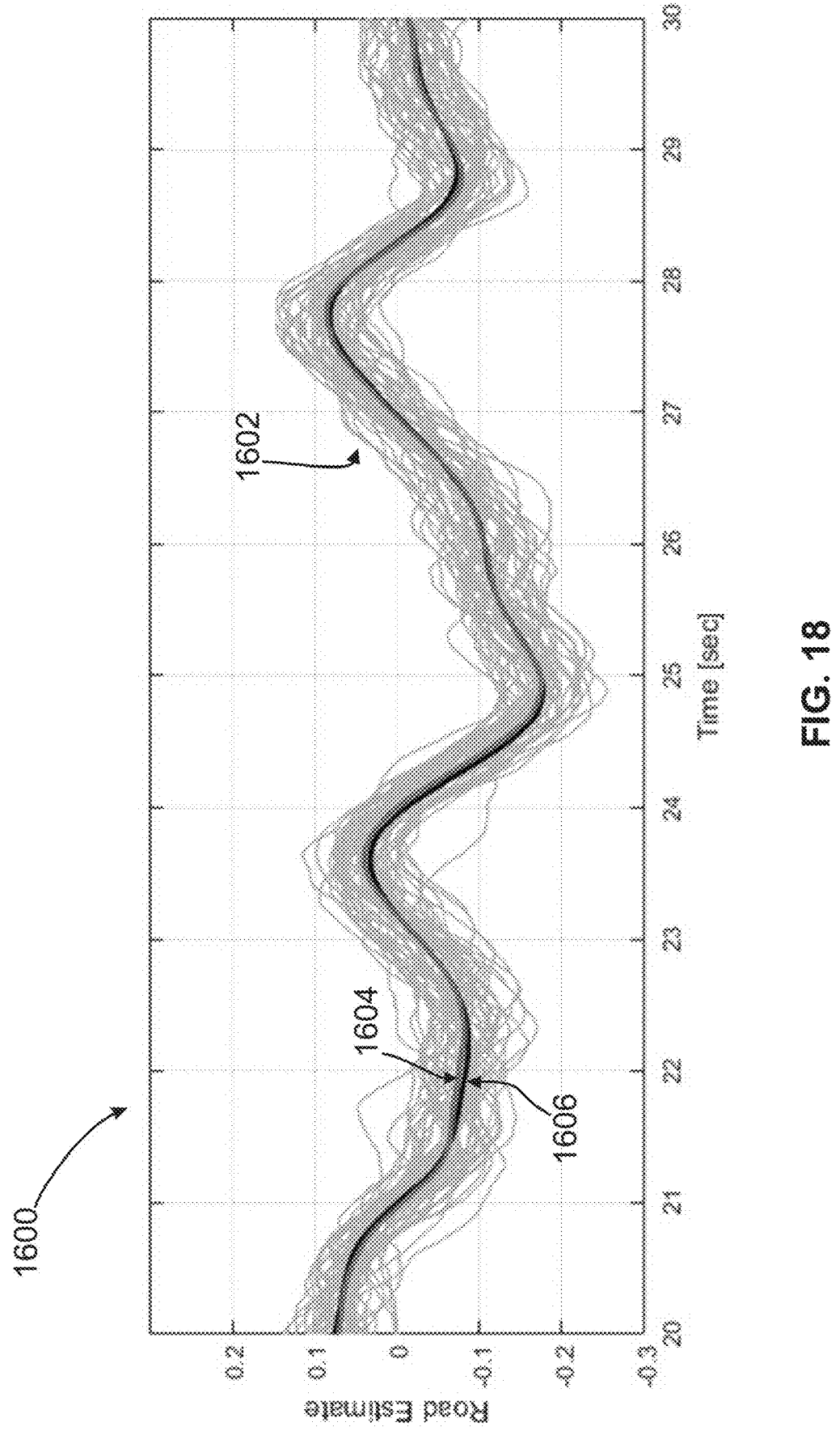
FIG. 18 is a graph showing individual road estimates, an average road estimate, and the true road.

Referring to FIG. 18, a graph 1600 compares the true road 1606, a composite road profile 1604, and individual road estimates 1602 from different vehicles, which are used to produce the composite road profile 1604. Because each vehicle that calculates road estimates 1602 may have different sensor calibrations, sensor placements, and vehicle dynamics, each vehicle may produce a road estimate that is different from the true road. Because all of these vehicles have different configurations, inaccuracies in the produced road estimates will not all be in the same direction or manner, as shown by the varying curves of road estimates 1602. As such, averaging the road estimates 1602 created by different vehicles traveling over the same road yields a composite road profile 1604 that is more accurate than any individual road estimate. Accuracy of the composite road profile 1604 can be determined by comparing the composite road profile 1604 to a measurement of the true road (which may be taken via other methods, e.g., vision, LiDAR, etc.).

Referring back to FIG. 17, after a sufficient number of estimates have been merged (e.g., 2 estimates, 5 estimates, 10 estimates, 20 estimates, 50 estimates, 100 estimates, etc.) to create an composite road profile, the terrain-based localization system 1500 uses the composite road profile to optimize road estimators of individual vehicles. Referring to FIG. 17, for the vehicle 1502 and a given road on which the vehicle 1502 has already driven, previously recorded raw sensor data from the given road is fed to the vehicle's road estimator 1506, which creates a road estimate using the sensor data and a given set of parameters. The controller 1504 then takes the road estimate and compares the road estimate, at block 1508, with a composite road profile 1510 computed based on data from many vehicles. The comparison determines an error 1512, which is fed into an optimizer 1514. The optimizer 1514 looks at the error and updates parameters to minimize the error. The updated parameters may include a correction factor on the signal for the one or more sensors of the vehicle used to create the individual road estimate.

The correction factor may include a range of corrections to be applied differently to data collected at different frequencies and may be dependent on the type of sensor used to collect the road data. For example, ride height sensors are generally more accurate at low frequency since they sense position rather than acceleration, but at higher frequencies, sensor noise may overwhelm any signal. A correction factor may therefore correct higher frequency data obtained by a ride height sensor more than the correction factor corrects lower frequency data obtained by a ride height sensor. In another example, wheel accelerometers are generally more accurate at determining high frequency motion of the wheel, but at very low frequencies, the vertical acceleration (the information desired from the wheel accelerometers) may be drowned out by the wheel accelerometers picking up lateral and longitudinal vehicle motion. A correction factor may therefore correct low frequency data obtained by a wheel accelerometer more than the correction factor corrects high frequency data obtained by a wheel accelerometer.

The updated parameters are then fed into the road estimator 1506. The road estimator 1506 then uses the updated parameters for subsequent road estimates (e.g., takes the raw sensor signal and applies a correction factor to create subsequent road estimates).

In some embodiments, instead of averaging a number of drives as the source of truth against which to optimize, other statistical measures may be used as the source of truth. For example, in one instance, it may be assumed that, on average, roads are white noise in velocity (i.e., all frequencies have equal magnitude) and this assumption may be used to tune the road estimator.

In some instances, the one or more individual parameters comprises a parameter of a physics model of the vehicle. The physics model may be used to fuse sensor information into the road estimate.

Cached Terrain-Based Road Data for Localization & Control

A motor vehicle traveling along a road, autonomously or under the control of a driver, may interact with one or more road-surface features or anomalies that may expose the vehicle and/or one or more vehicle occupants to certain forces or accelerations. Such forces or accelerations may affect the comfort, safety, and/or wellbeing of vehicle occupants as well as wear-and-tear of on the vehicle. The magnitude, direction, and/or frequency content of such forces or accelerations may be a function, to a great extent, of the characteristics of one or more road-surface features or anomalies.

A priori information about road-surface features ahead of a vehicle may be used to, for example, dynamically tune, prepare, and/or control various automated or partially-automated systems in the vehicle (such as for example, suspension systems (semi or fully active), propulsion systems, ADAS, EPS, and/or ABS, etc.).

However, a priori information about upcoming distinctive features, associated with a road, may also be used by, for example, a localization system to determine the location of a vehicle. In some embodiments, a localization system may be used to determine the position of a vehicle relative to one or more features or anomalies associated with a road.

In some embodiments, information about the road ahead of a vehicle, including lane-to-lane differences, may be received from various sources, such as for example, from cloud-based databases. Inventors have recognized that, in some embodiments, substantial amount of detailed data about a road surface may be transferred to a vehicle to provide a vehicle information to support localization of the vehicle and/or a priori dynamic tuning and/or control of one or more vehicle systems.

Inventors recognized that, in some embodiments, the use of information about road features for localization and/or vehicle control based on a priori data, may involve the exchange of large quantities data between a vehicle and, for example, a cloud-based data base. However, exchange of such data during peak travel times, such as morning and evening rush-hours may be expensive and/or hampered by slow data transfer rates. In some implementations, such disadvantages may be overcome by strategically caching data and transferring data when there is less demand for communication resources.

Alternatively or additionally, in some embodiments, a vehicle may collect road data for uploading at a later time. For example, the vehicle may collect data about the road surface of the road being travelled, associate the data with position along the road surface, and store the data locally for transfer at a later time. For example, the data may be uploaded when a Wi-Fi or hard-wired (e.g. ethernet) connection is available or when cell phone communication channels are less crowded. Uploaded data may be incorporated in a cloud database and used by the same or other vehicles in on future occasions.

Inventors have further recognized that in some embodiments, a hard-wired connection (such as an ethernet connection) may be incorporated in, attached to, or otherwise combined with the charging cable of an electric or hybrid-electric vehicle.

Inventors have further recognized that, in some implementations, there may generally be a high degree of repeatability and/or predictability in daily vehicle travel. This may be because drivers frequently travel the same roads on a daily basis, such as for example, while going to or from work. This is sometimes also true on the job, for example, on a delivery route while delivering mail or packages.

FIG. 19 illustrates vehicle 1702 which may be parked, overnight, in a garage 1704 that is may be in close proximity to home 1706. On typical work days, vehicle 1702 may be used to commute to work at an office building 1708. On most occasions, route 1710 may be used for the entire trip between home 1706 and office building 1708. On some occasions route 1712 may be used. Portions of routes 1712 and 1710 may overlap. Routes 1710 or 1712 or a different route 1714 may be used during the return commute.

Instead of downloading road information in real time (e.g., as it is used during each morning and/or evening commute) road surface information may be at least partially downloaded in advance, e.g., downloaded from a cloud-based database and cached, e.g., stored locally on the vehicle or on a cell phone or other appropriate portable device as the disclosure is not limited only to the local data storage devices discussed above. Locally pre-stored road information may then be made available to one or more controllers on the vehicle during the commute for localization and/or control of various onboard systems. In some embodiments, road information may be pre-downloaded using cell phone data communications and/or other communication channels such as, for example, Wi-Fi or hardwired (e.g., ethernet) connections or any other appropriate communication channel. Such alternate communications may be established at any appropriate location, such as for example, garage 1704, home 1706 and/or office building 1708. As discussed above, a hard-wired connection (such as an ethernet connection) may be incorporated in, attached to, or otherwise combined with the charging cable of an electric or hybrid-electric vehicle.

Alternatively or additionally, in some embodiments, vehicle 1702 may use one or more onboard sensors to collect and cache road data about routes taken during one or more trips, e.g. morning or evening commutes, and then upload such road data during off-peak hours such as when the vehicle is parked at home 1706 or at office building 1708.

The inventors have recognized that road data may remain unchanged or effectively unchanged over significant periods such as, for example, days, weeks or longer. In such cases, downloaded road data may be used multiple times without the need of updating. In some implementations, road data stored locally in a vehicle or cell phone may be associated with a data tag, such as for example, a time stamp that includes or is based on the date and time when the data was downloaded. Before downloading new data from a centralized data storage, e.g., a cloud-based database, a microprocessor onboard the vehicle may share the data tag of the data stored locally, e.g., in the vehicle or an accessible cell phone, with the cloud-based database. If it is determined, based at least partially on the data tag, that locally stored road data is sufficiently up-to-date, the decision may be made by the vehicle, the vehicle operator, and/or the central database to forego the download of a new version of the road data and instead rely on data already stored locally.

Under some circumstances, travel to infrequent or unprecedent destinations may occur, such as for example, to a shopping mall, an amusement park or a vacation destination. FIG. 19 illustrates a trip to a seaside motel 1716 along route 1718. Under such circumstances, road data may not be available locally. However, appropriate road data may be at least partially downloaded prior to starting the trip, e.g., when the vehicle is still parked and/or has access to a Wi-Fi or a hardwired (e.g., ethernet) connection to a cloud database. As discussed above, a hard-wired connection (such as an ethernet connection) may be incorporated in, attached to, or otherwise combined with the charging cable of an electric or hybrid-electric vehicle.

FIG. 20 illustrates an exemplary scenario 1800 where there may be an anticipated trip to a potential new or infrequent destination. At step 1802 the vehicle may receives an indication of a potential new destination. This indication may be received by, for example, synchronizing with a predetermined Google calendar, a user interface in the vehicle, or a cell phone app (i.e., application software). In step 1804, a navigation system may be used to plan a route to the anticipated destination, such as route 1718 in FIG. 19. At step 1806, a test may be conducted to determine if the route selected in step 1804 is a new route, for which road data may not have been downloaded previously. At step 1808, road data for at least a portion of the selected route is downloaded before the vehicle has started to travel along the selected route. In step 1810, the road data may be utilized as the vehicle travels along the selected route to locate the position of the vehicle and/or to control one or more vehicle systems. However, at step 1806, it may be determined that road data for the selected route had been downloaded previously. At step 1812 a data tag associated with the road data previously downloaded may be obtained and shared with the cloud data base. If at test 1814, it is determined that the previously downloaded data is out-of-date, a supplementary download may be conducted, at step 1808, before the vehicle starts travelling along the selected route. Alternatively, if at test 1814, it is determined that the previously downloaded data is current or sufficiently current, the previously downloaded data may be used in step 1810.

Maintaining Vehicle Anonymity During Cloud-Based Vehicle Control

In some embodiments of cloud-based vehicle localization and/or control, there may be a multiplicity of independent cloud-based databases may be used in use. As used herein, the term "independent cloud-based databases" refers to two or more cloud-based databases that are owned or operated by entities, e.g., corporations, that are independent of each other.

FIG. 21 illustrates a cloud-based vehicle localization and control system 1900 that includes two independent cloud-based databases 1902 and 1914. Cloud-based database 1902, which may, for example be owned or controlled by a vehicle manufacturer, may communicate with vehicle 1904 to exchange information including, for example, data about the road surface just traversed and/or about to be traversed by the vehicle. Such data may include information about coefficient of friction at location 1906, pothole 308, bump 1909, depression 1910 and/or slope 1912. The data uploaded by vehicle 1904 to cloud-based database 1902 may include vehicle-identifying metadata such as, for example, Vehicle Identification Number (VIN) or a cell phone number associated with vehicle 1904.

At least some of the data 1904a uploaded to database 1902 may be transferred to independent database 1914 for further analysis and/or processing. However, before transmitting the data to database 1914, a microprocessor 1903, associated with database 1902, may alter or replace at least a portion of the metadata that may identify the source of the data 1904a. In some implementations, the processor 1903 may append new confidential tracking identifiers to the data transmitted to database 1914. The confidential tracking identifiers may be used by one or more microprocessors 1915 associated with database 1914 to track data 1904a without having access to the identity of the source of the data.

The microprocessor may then append the tracking identifiers to data 1914a transmitted back to database 1902. Microprocessor 1903 may then use the tracking identifiers to identify vehicle 1904 and transmit, to vehicle 1904, information 1902b that may, for example, be related to the location of vehicle 1904 and/or the operation of systems in that vehicle.

Consequently, microprocessor 1915 associated with database 1914 may track data originating from vehicle 1904 and send information back to vehicle 1904, without knowing the identity of vehicle 1904 or its owner.

System Performance Tracking

In some implementations, microprocessor 1915, shown in FIG. 21, may track the history of performance metrics of various vehicle systems over time as a function of, for example, vehicle age or miles driven since new. Systems that may be tracked may include, for example, braking systems, active suspension systems, semi-active suspension systems, anti-lock braking systems (ABS), stability control systems, electric power steering systems (EPS), propulsion systems, etc. Such systems may be tracked on an aggregate basis by, for example, averaging all or most of the data received by database 1914. Data received by database 1914 may be provided by database 1902 in addition to other databases each of which may be operated by various manufacturers, e.g., original equipment manufacturers (OEMs) or component suppliers. Data received by database 1914 may be tracked, for example by microprocessor 1915 on the basis of average system performance metrics for each vehicle manufacturer, each vehicle model, and/or each individual vehicle. The information tracking identifiers, associated with data from a particular vehicle, such as data, from vehicle 1904, provided by database 1902 may be used to track the evolution of one or more system metrics for a particular vehicle. For example, database 1914 may track evolution over time of the performance metrics of one or more systems of vehicle 1904. For example, based on information received by database 1904, the microprocessor 1915 may be used to determine the variation over time of braking distance and/or tire grip under the same, effectively the same, or similar driving conditions.

Microprocessor 1914 may associate the tracked performance metrics with the appropriate information tracking data tag, without having access to the vehicle identification information of vehicle 1902. The metrics history of one or more system onboard vehicle 1904 may be provided to the vehicle owner or a repair shop selected by the owner or operator of vehicle 1904 via database 1902. The information may be, for example, used by the vehicle owner to schedule and/or perform repairs and/or prevented preventive maintenance of various systems in vehicle 1904.

Accordingly, data privacy may be maintained because database 1914 does not have access to the identifying metadata provided to database 1902 by vehicle 1904.

The invention claimed is:

1. A method of determining a location of a vehicle using terrain-based localization, during a trip to a destination, the method comprising:
   selecting the destination of the trip;
   with a navigation system, planning a route of travel to the destination;
   after planning the route but prior to traveling along the planned route, downloading reference road profile information for one or more road segments in the planned route from a remote database;
   prior to traveling along the planned route, storing the downloaded reference road profile information on a local information storage unit in the vehicle;
   commencing travel along the planned route;
   travelling along the one or more road segments;
   while travelling along the one or more road segments, collecting road profile information with at least one sensor on-board the vehicle;
   using terrain-based localization to determine the location of the vehicle, wherein the terrain-based localization includes a comparison of the reference road profile information, downloaded and stored prior to the commencement of the trip, and the road profile information collected while travelling along at least the one or more road segments.

2. The method of claim 1, further comprising using the road profile information to control an aspect of a system in the vehicle during the trip.

3. The method of claim 1, wherein the reference road profile information is downloaded and stored while the vehicle is parked.

4. The method of claim 3, wherein the reference road profile information is downloaded using a connection selected from the group consisting of WiFi, a hard wired connection, and an ethernet connection.

5. The method of claim 4, wherein the vehicle is selected from the group consisting of an electric vehicle and a plug-in hybrid-electric vehicle, and wherein the ethernet connection is integrated with a charging cable.

6. The method of claim 3, wherein the vehicle is parked in a garage associated with a home or a business.

7. The method of claim 3, wherein the travelling occurs during peak travel times and downloading of reference road profile information occurs during hours when demand for communication resources is lower than it is during peak travel times.

8. The method of claim 3, wherein the selecting of the destination is based at least partly on information received from a user interface.

9. The method of claim 1, further comprising, before starting the trip, confirming that the reference road profile information is up-to-date.

10. The method of claim 1, wherein selecting the route includes accessing data from a predesignated electronic calendar.

11. The method of claim 10, wherein the predesignated electronic calendar is accessed via a cell phone.

12. The method of claim 1, wherein the local information storage unit is in a cell phone.

13. The method of claim 1, wherein selecting the destination includes accessing data from a user interface in the vehicle.

14. The method of claim 1, wherein the one or more segments is an entirety of the planned route.

15. The method of claim 1, wherein the navigation system is located in a cell phone.

16. A method of determining a location of a vehicle while the vehicle is traveling to a destination, the method comprising:
   selecting the destination;
   using a navigation system to select a route to the destination;
   determining that reference road profile data for at least a portion of the selected route that is selected is available onboard the vehicle;
   verifying that the available reference road profile data onboard the vehicle is up-to-date;
   commencing travel along the selected route;
   collecting road profile data with at least one sensor on-board the vehicle, while traveling along at least the portion of the selected route; and
   performing terrain-based localization to determine the location of the vehicle, wherein the terrain-based localization includes comparing the reference road profile data, downloaded and stored prior to the commencement of the travel along the selected route, and the road profile data collected while travelling along at least the portion of the selected route.

17. A method of providing road preview information to a vehicle using two separate cloud-based databases while maintaining the vehicle's anonymity, the method comprising:

receiving, from the vehicle at a first cloud-based database, data based on measurements made with at least one sensor on board the vehicle;

receiving, from the vehicle at the first cloud-based database, vehicle identifying data;

creating a data tag based on the received vehicle identifying data;

associating the data tag with the data based on measurements received from the vehicle;

providing information to a second cloud-based database that includes the data based on measurements received from the vehicle at the first cloud-based database, and the associated data tag, wherein the second cloud-based database is operated independently from the first cloud-based database;

receiving at the first cloud-based database, from the second cloud-based database, road preview information for the vehicle determined based at least partially on the information provided to the second cloud-based database by the first cloud-based database, wherein the road preview information includes data characterizing at least an aspect of a road ahead of the vehicle, and wherein road preview information is associated with the data tag;

at the first cloud-based database, based on the data tag, associating the road preview information with the vehicle; and providing the road preview information to the vehicle.

18. The method of claim 17, wherein the at least one sensor is selected from the group consisting of an accelerometer mounted on an unsprung mass of the vehicle, an accelerometer mounted on a sprung mass of the vehicle, and an IMU.

19. The method of claim 17, wherein the information received from the vehicle at a first cloud-based database includes a road profile of a road surface of the road.

\* \* \* \* \*